United States Patent
Chen et al.

(10) Patent No.: US 9,532,052 B2
(45) Date of Patent: Dec. 27, 2016

(54) CROSS-LAYER POC ALIGNMENT FOR MULTI-LAYER BITSTREAMS THAT MAY INCLUDE NON-ALIGNED IRAP PICTURES

(71) Applicant: QUALCOMM Incorporated, San Diego, CA (US)

(72) Inventors: Ying Chen, San Diego, CA (US); Ye-Kui Wang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 14/245,115

(22) Filed: Apr. 4, 2014

(65) Prior Publication Data

US 2014/0301439 A1    Oct. 9, 2014

Related U.S. Application Data

(60) Provisional application No. 61/809,855, filed on Apr. 8, 2013, provisional application No. 61/846,532, filed on Jul. 15, 2013.

(51) Int. Cl.
*H04N 19/70*   (2014.01)
*H04N 19/187*  (2014.01)
(Continued)

(52) U.S. Cl.
CPC ........ *H04N 19/00884* (2013.01); *H04N 19/30* (2014.11); *H04N 19/46* (2014.11);
(Continued)

(58) Field of Classification Search
None
See application file for complete search history.

(56) References Cited

U.S. PATENT DOCUMENTS

2014/0247883 A1 *  9/2014  Lee ..................... H04N 19/513
                                              375/240.16
2014/0301451 A1 * 10/2014  Deshpande .......... H04N 19/597
                                              375/240.12
(Continued)

OTHER PUBLICATIONS

Chen, et al., "MV-HEVC/SHVC HLS: Cross-layer POC alignment," JCT-3V Meeting; Jul. 25-Aug. 2013; Vienna; (The Joint Collaborative Team on 3D Video Coding Extension Development of ISO/IEC JTC1/SC29/WG11 and ITU-T SG.16); Retrieved from the Internet , No. JCT3V-E0075, XP030131078, 4 pp.

(Continued)

*Primary Examiner* — Frederick Bailey
(74) *Attorney, Agent, or Firm* — Shumaker & Sieffert, P.A.

(57) ABSTRACT

In one example, a video coder is configured to code a value for a syntax element indicating whether at least a portion of a picture order count (POC) value of a picture is to be reset to a value of zero, when the value for the syntax element indicates that the portion of the POC value is to be reset to the value of zero, reset at least the portion of the POC value such that the portion of the POC value is equal to zero, and code video data using the reset POC value. Coding video data using the reset POC value may include inter-predicting a block of a subsequent picture relative to the picture, where the block may include a motion parameter that identifies the picture using the reset POC value. The block may be coded using temporal inter-prediction or inter-layer prediction.

38 Claims, 6 Drawing Sheets

(51) Int. Cl.
*H04N 19/30* (2014.01)
*H04N 19/46* (2014.01)
*H04N 19/68* (2014.01)
*H04N 19/597* (2014.01)

(52) U.S. Cl.
CPC ............ *H04N 19/68* (2014.11); *H04N 19/70* (2014.11); *H04N 19/597* (2014.11)

(56) References Cited

U.S. PATENT DOCUMENTS

2015/0063463 A1* 3/2015 Choi .................. H04N 19/70 375/240.25
2016/0044324 A1* 2/2016 Deshpande ............ H04N 19/70 375/240.25

OTHER PUBLICATIONS

Choi, et al., "3D-HEVC HLS: On Picture order counts," MPEG Meeting; ; Geneva; (Motion Picture Expert Group or ISO/IEC JTC1/SC29/WG11), No. m24874, May 2012, XP030053217, 4 pp.
Choi, et al., "MV-HEVC/SHVC HLS: Alignment of picture order counts," JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16); No. JCT3V-F0053, XP030131458, 5 pp.
Hannuksela, et al., "POC Granularity for Reference Picture Sets and Slice Header," MPEG Meeting; Feb. 1-10, 2012; San Jose CR; (Motion Picture Expert Group or ISO/IEC JTC1/SC29/WG11), No. m23301, XP030051826, 8 pp.
Wiegand, et al., JVT: "Joint Draft 6: Scalable Video Coding," JVT Meeting; Apr. 1-7, 2006; Geneva, CH; (Joint Video Team of ISO/IEC JTC1/SC29/WG11 and ITU-T SG.16), No. JVT-S201, XP030006479, 538 pp.
Ramasubramonian, et al., "MV-HEVC/SHVC HLS: On picture order count," JCT-VC Meeting; Oct. 23-Nov. 1, 2013; Geneva; (Joint collaborative Team on Video Coding of ISO/IEC JTC1/SC29/WG11 and ITU-T SG.16); Retrieved from the Internet No. JCTVC-00213, XP030115261, 10 pp.
Sullivan, "CRA pictures with broken links", MPEG Meeting; Apr. 27-May 7, 2012; Geneva; (Motion Picture Expert Group or ISO/IEC JTC1/SC29/WG11), No. m24653, Document: JCTVC-I4040, XP030052996, 3 pp.
Wang, et al., "AHG9: On cross-layer alignments in HEVC 3DV and scalable extensions," JCT-VC Meeting; MPEG Meeting; Apr. 18-26, 2013; Incheon; (Joint collaborative team on video coding of ISO/IEC JTC1/SC29/WG11 and ITU-T SG.16); Retrieved from the Internet No. JCTVC-M0266, XP030114223, 6 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
International Search Report and Written Opinion from International Application No. PCT/US2014/033172, dated Jul. 11, 2014, 15 pp.
Response to Written Opinion dated Jul. 11, 2014, from International Application No. PCT/US2014/033172, filed on Jan. 15, 2015, 6 pp.
Second Written Opinion from International Application No. PCT/US2014/033172, dated Mar. 24, 2015, 6 pp.
Response to Second Written Opinion dated Mar. 24, 2015, from International Application No. PCT/US2014/033172, filed on May 21, 2015, 6 pp.
International Preliminary Report on Patentability from International Application No. PCT/US2014/033172, dated Jun. 25, 2015, 10 pp.
Tech, et al., MV-HEVC Draft Text 3 (ISO/IEC 23008-2:201x/PDAM2); JCT-3V Meeting; (Joint Collaborative Team on 3D Video Coding Extension Development of ITU-T SG 16 WP 3 and ISO/IEC JTC 1/SC 29/WG 11); No. JCT3V-C1004_d3, Mar. 27, 2013; 34 pp.
Chen, et al., "SHVC Draft Text 1," JCT-VC Meeting; (Joint Collaborative Team on 3D Video Coding Extension Development of ITU-T SG 16 WP 3 and ISO/IEC JTC 1/SC 29/WG 11); No. JCTVC-L1008, Mar. 20, 2013, 34 pp.

* cited by examiner

CROSS-LAYER POC ALIGNMENT FOR MULTI-LAYER BITSTREAMS THAT MAY INCLUDE NON-ALIGNED IRAP PICTURES

This application claims the benefit of U.S. Provisional Application Ser. No. 61/809,855, filed Apr. 8, 2013, and U.S. Provisional Application Ser. No. 61/846,532, filed Jul. 15, 2013, each of which is hereby incorporated by reference in its respective entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding a syntax element for a picture that indicates whether a picture order count (POC) value for the picture is to be reset. In particular, a video coder (such as a video encoder or a video decoder) may code a value that indicates that a POC value for a non-intra random access point (IRAP) picture is to be reset when the non-IRAP picture is included in an access unit with an IRAP picture, e.g., in different video coding layers. In this manner, the techniques of this disclosure may support non-alignment of IRAP pictures across different video coding layers, while also ensuring that POC values are aligned among pictures of different video coding layers.

In one example, a method of decoding video data includes determining whether a value for a syntax element indicates that at least a portion of a picture order count (POC) value of a picture is to be reset to a value of zero, when the value for the syntax element indicates that the portion of the POC value is to be reset to the value of zero, resetting at least the portion of the POC value such that the portion of the POC value is equal to zero, and decoding video data using the reset POC value.

In another example, a method of encoding video data includes determining whether to reset at least a portion of a picture order count (POC) value of a picture to a value of zero, in response to determining to reset the at least portion of the POC value, resetting at least the portion of the POC value, such that the portion of the POC value is equal to zero, and encoding a value for a syntax element that indicates that at least the portion of the POC value is to be reset to the value of zero, and encoding video data using the reset POC value.

In another example, a device for coding video data includes a video coder configured to code a value for a syntax element indicating whether at least a portion of a picture order count (POC) value of a picture is to be reset to a value of zero, when the value for the syntax element indicates that the portion of the POC value is to be reset to the value of zero, reset at least the portion of the POC value such that the portion of the POC value is equal to zero, and code video data using the reset POC value.

In another example, a device for coding video data includes means for coding a value for a syntax element indicating whether at least a portion of a picture order count (POC) value of a picture is to be reset to a value of zero, means for resetting, when the value for the syntax element indicates that the portion of the POC value is to be reset to the value of zero, at least the portion of the POC value such that the portion of the POC value is equal to zero, and means for coding video data using the reset POC value.

In another example, a computer-readable storage medium has stored thereon instructions that, when executed, cause a programmable processor to code a value for a syntax element indicating whether at least a portion of a picture order count (POC) value of a picture is to be reset to a value of zero, when the value for the syntax element indicates that the portion of the POC value is to be reset to the value of zero, reset at least the portion of the POC value such that the portion of the POC value is equal to zero, and code video data using the reset POC value.

The details of one or more examples are set forth in the accompanying drawings and the description below. Other features, objects, and advantages will be apparent from the description and drawings, and from the claims.

DETAILED DESCRIPTION

Figure 1:
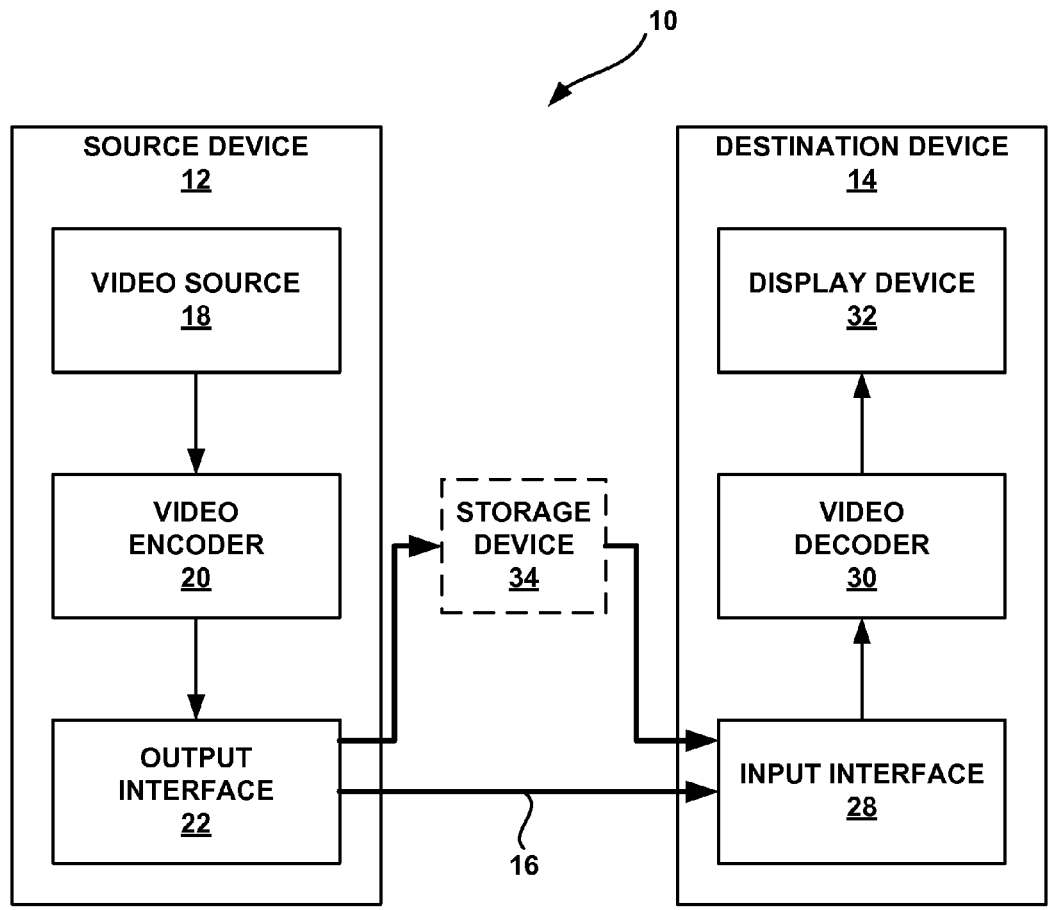
FIG. 1 is a block diagram illustrating an example video encoding and decoding system in accordance with one or more examples described in this disclosure.

This disclosure describes techniques for supporting non-aligned intra random access point (IRAP) pictures that may start a new coded video sequence such that the same picture order count (POC) values are guaranteed to be cross-layer aligned. The techniques may be applied in multi-layer coding. Some disclosed methods can also be applied to single-layer video coding.

In particular, non-aligned IRAP pictures occur in situations where an access unit includes both an IRAP picture and a non-IRAP picture in different video coding layers. Pictures in a coded video sequence (CVS) have POC values that uniquely identify the respective pictures in that CVS. POC values of pictures generally indicate output orders of the pictures relative to other pictures in the same CVS. IRAP pictures have POC values of 0. Thus, non-aligned IRAP pictures lead to access units including pictures having different POC values.

However, POC values are used to identify inter-layer reference pictures. That is, when a picture is coded using inter-layer prediction (e.g., inter-view prediction), a POC value of a reference picture is signaled such that a video decoder can identify the reference picture. Where POC values are aligned, it is simple to determine that a current picture is inter-layer predicted, namely, when the POC value of the reference picture is the same as the POC value of the current picture. Misaligned POC values of pictures between video coding layers make identification of reference pictures more difficult. Furthermore, access unit boundaries become difficult to detect, and can be prone to errors.

Therefore, this disclosure describes techniques for allowing non-aligned IRAP pictures while also ensuring that POC values for pictures in a common access unit are cross-aligned. In particular, a syntax element may indicate that at least a portion of a POC value for a picture is to be reset (that is, set to a value of zero). For instance, a video encoder may determine that an access unit includes an IRAP picture in one layer and a non-IRAP picture in another, different layer. The video encoder may therefore signal that the POC value for the non-IRAP picture is to be reset. A video decoder may reset the POC value for the non-IRAP picture, and also modify POC values of other pictures in the same video coding layer as the non-IRAP picture. That is, the video decoder may modify POC values of these other pictures such that differences between the POC value of the non-IRAP picture and other pictures in the same layer and the same CVS remain constant after resetting the POC value of the non-IRAP picture.

By adjusting POC values in this manner, all pictures in a common access unit may be ensured to have the same POC value, yet IRAP pictures do not need to be aligned. Thus, access unit boundary detection can be simplified and made more error resilient, and identification of inter-layer reference pictures can also be simplified.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, referred to as HEVC WD10 hereinafter, is available from: http://phenix.int-evry.fr/jct/doc_end_user/documents/12_Geneva/wg11/JCTVC-L1003-v34.zip The multiview extension to HEVC, namely MV-HEVC, is also being developed by the JCT-3V. A recent Working Draft (WD) of MV-HEVC, referred to as MV-HEVC WD3 hereinafter, is available from: http://phenix.it-sudparis.eu/jct2/doc_end_user/documents/3_Geneva/wg11/JCT3V-C1004-v4.zip The scalable extension to HEVC, named SHVC, is also being developed by the JCT-VC. A recent Working Draft (WD) of SHVC, referred to as SHVC WD1 hereinafter, is available from: http://phenix.int-evry.fr/jct/doc_end_user/documents/12_Geneva/wg11/JCTVC-L1008-v1.zip.

This document assumes the following concepts of (coded) picture, access unit (AU), IRAP AU, coded video sequence (CVS), and bitstream, though the methods also apply if some of these assumptions are changed:

(coded) picture: Similar to the current (coded) picture definition, where a coded picture is equivalent to a layer representation in SVC, a view component in MVC and a texture or depth view component in MVC+D.

access unit: Similar as in SVC and MVC, an AU consists of all the coded pictures associated with the same output time and their associated non-VCL NAL units.

IRAP access unit: An access unit in which all the coded pictures are IRAP pictures.

coded video sequence (CVS): A sequence of access units that consists, in decoding order, of an TRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1.

Note that the wording is the same as in HEVC WD10.

bitstream: A sequence of bits, in the form of a NAL unit stream or a byte stream, that forms the representation of one or more CVSs.

The first AU in a bitstream shall be an IRAP AU (as defined above).

Instantaneous decoder refresh (IDR) pictures, clean random access (CRA) pictures, and broken link access (BLA) pictures are collectively referred to as IRAP pictures.

Requiring cross-layer alignment for IRAP pictures would disallow some advantageous usage scenarios. For example, in a two-layer bitstream, when there are more TRAP pictures in the base layer than in the enhancement layer, in broadcast and multicast applications, low-delay tuning-in while at the same time high coding efficiency can be achieved. Thus, it is desirable to allow for non-aligned IRAP pictures.

However, when one picture (picA) is an IRAP picture with NoRaslOutputFlag equal to 1 and another picture (picB) in the same access unit is not an IRAP picture with NoRaslOutputFlag equal to 1, the POC value of a picture (picC) in the layer containing picA may be different from the POC value of a picture (picD) in the layer containing picB, where picC and picD are in the same access unit, and picC may or may not be picA (and consequently picD may or may not be picB). This is because each IRAP picture with NoRaslOutputFlag equal to 1 resets the POC value to be equal to the POC least significant bits (LSB) signaled or derived for the TRAP picture with NoRaslOutputFlag equal to 1.

This makes it more difficult for identification of reference pictures in multi-layer video coding with inter-layer prediction compared to when POC values are cross-aligned. For example, in MV-HEVC WD3, POC is used as one of the two dimension identifications to identify an inter-layer reference picture.

Furthermore, this makes access unit (AU) boundary detection more difficult and not error resilient. For example, assume that AU1 consists of picA and picB in the base layer and enhancement layer, respectively, AU2 consists of picC and picD in the base layer and enhancement layer, respectively, and AU1 precedes AU2 in decoding order. Then, if both picB and picC get lost, there is no way for a decoder to know that the received picA and picD belong to two different AUs based on the coded pictures. In the same example, if AU2 consists of only picD in the enhancement layer while picC never exists, then the same problem would occur even when only one picture, picB, gets lost.

This disclosure describes techniques that enable non-cross-alignment of TRAP pictures with NoRaslOutputFlag equal to 1, while at the same time providing cross-alignment of POC values for all AUs at the same time.

FIG. 1 is a block diagram illustrating an example video encoding and decoding system in accordance with one or more examples described in this disclosure. For example, system 10 includes source device 12 and destination device 14. Source device 12 and destination device 14 are configured to implement the techniques described in this disclosure. In some examples, system 10 may be configured to support encoding, transmission, storage, decoding, and/or presentation of encoded video data, such as video data encoded according to the HEVC standard, e.g., as described in WD10, and its extensions, such as, for example, the extensions described in MV-HEVC WD3, SHVC WD1, or the like. However, the techniques described in this disclosure may be applicable to other video coding standards or other extensions.

As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the ITU-T H.264 standard, alternatively referred to as MPEG 4, Part 10, Advanced Video Coding (AVC), or extensions of such standards. Alternatively, video encoder 20 and video decoder 30 may operate according to other proprietary or industry standards, such as the High Efficiency Video Coding (HEVC) standard presently under development, as well as extensions of the HEVC standard. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

In accordance with the techniques of this disclosure, video encoder 20 and video decoder 30 may be configured to code values of syntax elements indicative of whether picture order count (POC) values of pictures are to be partially or fully reset. A partial reset may correspond to setting a portion of the POC value, e.g., only most significant bits (MSBs), equal to zero. A full reset may correspond to setting all bits of the POC value equal to zero. Thus, when the syntax element indicates that a POC value of a picture is to be partially or fully reset, video decoder 30 may reset corresponding bits of the POC value to zero.

In addition, video decoder 30 may also set bits of POC values of other pictures in the same layer as the picture for which the POC value was reset, such that differences between the POC values of these other pictures remain the same following the reset as before the reset. For example, for each of N other pictures, video decoder 30 may determine a difference $D_i$, where i is between 0 and N−1 inclusive and represents one of these other pictures. In this example, video decoder 30 may calculate $D_i = POC_{base} - POC_i$, where "base" refers to the picture for which the POC value was reset. Video decoder 30 may then decrement such that $POC_{i\_decremented} + D_i = POC_{base\_reset}$, where $POC_{i\_decremented}$ represents the decremented POC value of picture i and $POC_{base\_reset}$ represents the reset value of $POC_{base}$. In examples where the POC value of a picture that is to be reset is set to zero, video decoder 30 may decrement POC values of other pictures in the same CVS and the same video coding layer by the initial (that is, prior to reset) POC value of the picture. Alternatively, video decoder 30 may set the POC values of other pictures in the same CVS and the same video coding layer equal to the difference between the initial POC value of the picture for which the POC value is to be reset and the POC value of the other picture (i.e., equal to $D_i$).

In one set of examples, a first flag is added to the slice header to specify whether the POC values are reset to be equal to the POC least significant bits (LSBs), i.e., the POC most significant bits (MSBs) are reset to equal to 0, and if so, the POC values of all pictures in the same layer as the current picture and in the decoded picture buffer (DPB) are decremented, such that difference between the POC values of the current picture and any picture in the same layer and in the DPB remains the same as if the first flag indicates otherwise.

In this set of examples, a second flag may be added to the slice header to specify whether the POC LSBs are reset to be equal to 0. When used together with the first flag, the second flag enables encoders to freely allocate different values of POC LSBs for pictures in the different layers. This set of examples enables non-cross-alignment of IRAP pictures with NoRaslOutputFlag equal to 1 while at the same time guaranteeing cross-alignment of POC values for all AUs at the same time, wherein the IRAP pictures with NoRaslOutputFlag equal to 1 may be any of the three types of IRAP pictures, i.e., IDR, CRA and BLA pictures.

In another set of examples, it is proposed that, when IDR pictures are not aligned in an access unit, if at least one picture in that AU is an IDR picture, the POC values of all pictures in one access unit are set to 0, similar to an IDR picture. This would enable non-cross-alignment of IRAP pictures with NoRaslOutputFlag equal to 1 while at the same time guaranteeing cross-alignment of POC values for all AUs at the same time, wherein the TRAP pictures with NoRaslOutputFlag equal to 1 are IDR pictures. More specifically, the following applies to this set of examples:

1. A flag, namely idr_au_present_flag, is signalled in slice header, e.g., being part of the bits signalled at the beginning of slice header with slice_reserved_flag[i].
    a. For a picture with nuh_layer_id larger than 0, the flag equal to 1 indicates that the POC value is reset to 0, as it is done for an IDR picture, the flag equal to 0 indicates that the POC value is not reset.

2. For an IDR picture, this flag may be used for other purposes, or may be reserved to be 1, or may be absent but inferred to be equal to 1.

For both sets of examples, for a picture with nuh_layer_id equal to 0, the flag does not take any effect for an HEVC version 1 decoder (which is a one-layer 2D decoder based on HEVC WD10), as such decoder ignores the flag(s).

Various examples of detailed implementations of these example techniques are described below. Proposed changes to the standard are highlighted below, where italicized text represents additions and [removed: " "] represents deletions with respect to the previous version of the standard. In general, video encoder 20 and/or video decoder 30 may be configured to perform the techniques of this disclosure. This disclosure describes a "video coder" as performing these techniques. It should be understood that the term "video coder" may refer to a video encoder, such as video encoder 20, or a video decoder, such as video decoder 30. Likewise, the term video coding may refer to video encoding and/or video decoding. A video coder, such as video encoder 20 or video decoder 30, may be configured to perform any or all of the techniques described in this disclosure. Where certain techniques are described from the perspective of a video decoder, a video encoder may perform the same or similar (e.g., reciprocal) techniques. Likewise, where certain techniques are described from the perspective of a video encoder, a video decoder may perform the same or similar (e.g., reciprocal) techniques.

A first example in accordance with the techniques of this disclosure is described below. This example is referred to below as Example 1. The syntax and semantics below, in general, refer to corresponding sections in HEVC WD10. As mentioned above, highlighting indicates proposed additions and strikethrough indicates proposed deletions.

EXAMPLE 1

The general slice segment header syntax and semantics are first described below.
General Slice Segment Header Syntax

| | Descriptor |
|---|---|
| slice_segment_header( ) { | |
| ... | |
|   if( !dependent_slice_segment_flag ) { | |
|     *numRsvBitsUsed = 0* | |
|     *if(nal_unit_type != IDR_W_RADL && nal_unit_type != IDR_N_LP )* { | |
|       *poc_msb_reset_flag* | *u(1)* |
|       *numRsvBitsUsed++* | |
|       *if(poc_msb_reset_flag )* { | |
|         *poc_lsb_reset_flag* | *u(1)* |
|         *numRsvBitsUsed++* | |
|       } | |
|     } | |
|     for( i = *numRsvBitsUsed*; i < num_extra_slice_header_bits; i++ ) | |
|       slice_reserved_flag[ i ] | u(1) |
|   ... | ue(v) |
| } | |

The general slice segment header semantics are described below. As mentioned above, italicized text indicates proposed additions and [removed: " "] indicates proposed deletions. Semantics for unchanged syntax elements may remain the same as the semantics described in the previous version of the standard.

poc_msb_reset_flag equal to 1 specifies that the derived picture order count for the current picture is equal to slice_pic_order_cnt_lsb. poc_msb_reset_flag equal to 0 specifies that the derived picture order count for the current picture may or may not be equal to slice_pic_order_cnt_lsb.

When present, the value of poc_msb_reset_flag shall be equal to 1 when the current picture is not an IRAP picture with NoRaslOutputFlag equal to 1 and at least one picture in the current access unit is an IRAP picture with NoRaslOutputFlag equal to 1.

When not present, the value of poc_msb_reset_flag is inferred to be equal to 0.

poc_lsb_reset_flag equal to 1 specifies that the derived picture order count for the current picture is equal to 0. poc_lsb_reset_flag equal to 0 specifies that the derived picture order count for the current picture may or may not be equal to 0.

When present, the value of poc_lsb_reset_flag shall be equal to 1 when the current picture is not an IDR picture and at least one picture in the current access unit is an IDR picture.

When not present, the value of poc_lsb_reset_flag is inferred to be equal to 0.

Accordingly, video encoder 20 may set poc_msb_reset_flag to have a value of 1 for a picture that is not an TRAP picture and that is in an access unit that includes an IRAP picture, e.g., in a different video coding layer. Likewise, video decoder 30, upon receiving a value of 1 for a picture that is not an IRAP picture, may reset the value of MSBs of the POC value for the picture, and adjust POC values of other pictures in the same layer and the same coded video sequence as needed.

The general decoding process semantics are described below. Video decoder 30 may be configured to decode video data as described below. Video encoder 20 may be configured to encode video data according to a reciprocal process to that described below. As mentioned above, the changes below may be made in reference to corresponding portions of HEVC WD10. Italicized text indicates proposed additions and [removed: " "] indicates proposed deletions.

General Decoding Process

Input to this process is a bitstream. Output of this process is a list of decoded pictures.

The layer identifier list TargetDecLayerIdList, which specifies the list of nuh_layer_id values, in increasing order of nuh_layer_id values, of the NAL units to be decoded, is specified as follows:

If some external means, not specified in this Specification, is available to set TargetDecLayerIdList, TargetDecLayerIdList is set by the external means.

Otherwise, if the decoding process is invoked in a bitstream conformance test as specified in subclause C.1, TargetDecLayerIdList is set as specified in subclause C.1.

Otherwise, TargetDecLayerIdList contains only one nuh_layer_id value that is equal to 0.

The variable HighestTid, which identifies the highest temporal sub-layer to be decoded, is specified as follows:

If some external means, not specified in this Specification, is available to set HighestTid, HighestTid is set by the external means.

Otherwise, if the decoding process is invoked in a bitstream conformance test as specified in subclause C.1, HighestTid is set as specified in subclause C.1.

Otherwise, HighestTid is set equal to sps_max_sub_layers_minus1.

The sub-bitstream extraction process as specified in clause 10 is applied with the bitstream, HighestTid, and TargetDecLayerIdList as inputs, and the output is assigned to a bitstream referred to as BitstreamToDecode.

The decoding processes specified in the remainder of this subclause apply to each coded picture, referred to as the current picture and denoted by the variable CurrPic, in BitstreamToDecode.

Depending on the value of chroma_format_idc, the number of sample arrays of the current picture is as follows:
  If chroma_format_idc is equal to 0, the current picture consists of 1 sample array $S_L$.
  Otherwise (chroma_format_idc is not equal to 0), the current picture consists of 3 sample arrays $S_L$, $S_{Cb}$, $S_{Cr}$.

The decoding process for the current picture takes as inputs the syntax elements and upper-case variables from clause 7. When interpreting the semantics of each syntax element in each NAL unit, the term "the bitstream" (or a part thereof, e.g., a CVS of the bitstream) refers to BitstreamToDecode (or a part thereof).

The decoding process is specified such that all decoders will produce numerically identical cropped decoded pictures. Any decoding process that produces identical cropped decoded pictures to those produced by the process described herein (with the correct output order or output timing, as specified) conforms to the decoding process requirements of this Specification.

When the current picture is an IRAP picture, the following applies:
  If the current picture is an IDR picture or a BLA picture, the variable NoRaslOutputFlag is set equal to 1.
  Otherwise (the current picture is a CRA picture), the following applies:
    If the current picture is the first picture in the bitstream in decoding order or the first picture that follows an end of sequence NAL unit in decoding order, all pictures in the same access unit shall be CRA pictures, the variable NoRaslOutputFlag is set equal to 1.
    Otherwise, if some external means not specified in this Specification is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag. In this case, the value of HandleCraAsBlaFlag for the current picture shall not be equal to 1 when there is one non-CRA picture in the current access unit.
    Otherwise, the variable HandleCraAsBlaFlag is set equal to 0 and the variable NoRaslOutputFlag is set equal to 0.

When the current picture has nuh_layer_id equal to 0, the decoding process for a coded picture with nuh_layer_id equal to 0 specified in subclause 8.1.1 is invoked.

The semantics for the decoding process for a coded picture with nuh_layer_id equal to 0 is described below. Video decoder 30 may be configured to decode video data as described below. Video encoder 20 may be configured to encode video data according to a reciprocal process to that described below.

Decoding Process for a Coded Picture with nuh_layer_id Equal to 0

When the current picture is a BLA picture that has nal_unit_type equal to BLA_W_LP or is a CRA picture, the following applies:

If some external means not specified in this Specification is available to set the variable UseAltCpbParamsFlag to a value, UseAltCpbParamsFlag is set equal to the value provided by the external means.
  Otherwise, the value of UseAltCpbParamsFlag is set equal to 0.

[removed: "When the current picture is an IRAP picture, the following applies:
  If the current picture with a particular nuh_layer_id is an IDR picture, a BLA picture, the first picture with that particular nuh_layer_id in the bitstream in decoding order, or the first picture with that particular nuh_layer_id that follows an end of sequence NAL unit in decoding order, the variable NoRaslOutputFlag is set equal to 1.
  Otherwise, if some external means not specified in this Specification is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
  Otherwise, the variable HandleCraAsBlaFlag is set equal to 0 and the variable NoRaslOutputFlag is set equal to 0."]

Depending on the value of separate_colour_plane_flag, the decoding process is structured as follows:
  If separate_colour_plane_flag is equal to 0, the decoding process is invoked a single time with the current picture being the output.
  Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1, and 2 being assigned to $S_L$, $S_{Cb}$, and $S_{Cr}$, respectively.
  NOTE—The variable ChromaArrayType is derived as equal to 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic:
  1. The decoding of NAL units is specified in subclause 8.2.
  2. The processes in subclause 8.3 specify the following decoding processes using syntax elements in the slice segment layer and above:
    Variables and functions relating to picture order count are derived in subclause 8.3.1. This needs to be invoked only for the first slice segment of a picture.
    The decoding process for RPS in subclause 8.3.2 is invoked, wherein reference pictures may be marked as "unused for reference" or "used for long-term reference". This needs to be invoked only for the first slice segment of a picture.
    When the current picture is a BLA picture or is a CRA picture with NoRaslOutputFlag equal to 1, the decoding process for generating unavailable reference pictures specified in subclause 8.3.3 is invoked, which needs to be invoked only for the first slice segment of a picture.

PicOutputFlag is set as follows:
   If the current picture is a RASL picture and NoRaslOutputFlag of the associated IRAP picture is equal to 1, PicOutputFlag is set equal to 0.
   Otherwise, PicOutputFlag is set equal to pic_output_flag.

At the beginning of the decoding process for each P or B slice, the decoding process for reference picture lists construction specified in subclause 8.3.4 is invoked for derivation of reference picture list 0 (RefPicList0) and, when decoding a B slice, reference picture list 1 (RefPicList1).

3. The processes in subclauses 8.4, 8.5, 8.6, and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each form a partitioning of the picture.

4. After all slices of the current picture have been decoded, the decoded picture is marked as "used for short-term reference".

The semantics for the decoding process for picture order count are described below.

Decoding Process for Picture Order Count

Output of this process is PicOrderCntVal, the picture order count of the current picture.

Picture order counts are used to identify pictures, for deriving motion parameters in merge mode and motion vector prediction, and for decoder conformance checking (see subclause C.5).

Each coded picture is associated with a picture order count variable, denoted as PicOrderCntVal.

When the current picture is not an IRAP picture with NoRaslOutputFlag equal to 1, the variables prevPicOrderCntLsb and prevPicOrderCntMsb are derived as follows:

Let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and prevPicOrderCnt be equal to PicOrderCntVal of prevTid0Pic.

The variable prevPicOrderCntLsb is set equal to prevPicOrderCnt & (MaxPicOrderCntLsb−1) [removed: "slice_pic_order_cnt_lsb of prevTid0Pic"].

The variable prevPicOrderCntMsb is set equal to prevPicOrderCnt−prevPicOrderCntLsb [removed: "PicOrderCntMsb of prevTid0Pic"].

The variable PicOrderCntMsb of the current picture is derived as follows:
   If the current picture is an TRAP picture with NoRaslOutputFlag equal to 1, PicOrderCntMsb is set equal to 0.
   Otherwise, PicOrderCntMsb is derived as follows:

```
if( ( slice_pic_order_cnt_lsb < prevPicOrderCntLsb ) &&
      ( ( prevPicOrderCntLsb − slice_pic_order_cnt_lsb ) >= (
MaxPicOrderCntLsb / 2 ) ) )
   PicOrderCntMsb = prevPicOrderCntMsb + MaxPicOrderCntLsb
      (8-1)
```

-continued

```
else if( (slice_pic_order_cnt_lsb > prevPicOrderCntLsb ) &&
      (slice_pic_order_cnt_lsb − prevPicOrderCntLsb ) >
      ( MaxPicOrderCntLsb
/ 2 ) ) )
   PicOrderCntMsb = prevPicOrderCntMsb − MaxPicOrderCntLsb
else
   PicOrderCntMsb = prevPicOrderCntMsb
```

PicOrderCntVal is derived as follows:
   PicOrderCntVal=(poc_msb_reset_flag? 0: PicOrderCntMsb)+(8-2) (poc_lsb_reset_flag? 0: slice_pic_order_cnt_lsb)

NOTE 1—All IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

When poc_msb_reset_flag is equal to 1, the PicOrderCntVal of each picture that is in the DPB and belongs to the same layer as the current picture is decremented by PicOrderCntMsb.

When poc_lsb_reset_flag is equal to 1, the PicOrderCntVal of each picture that is in the DPB and belongs to the same layer as the current picture is decremented by slice_pic_order_cnt_lsb.

The value of PicOrderCntVal shall be in the range of $-2^{31}$ to $2^{31}-1$, inclusive. In one CVS, the PicOrderCntVal values for any two coded pictures in the same layer shall not be the same.

The function PicOrderCnt(picX) is specified as follows:
   PicOrderCnt(picX)=PicOrderCntVal of the picture picX (8-3)

The function DiffPicOrderCnt(picA, picB) is specified as follows:
   DiffPicOrderCnt(picA, picB)=PicOrderCnt(picA)−PicOrderCnt(picB) (8-4)

The bitstream shall not contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

Decoding Process for Reference Picture Set

This process is invoked once per picture, after decoding of a slice header but prior to the decoding of any coding unit and prior to the decoding process for reference picture list construction for the slice as specified in subclause 8.3.3. This process may result in one or more reference pictures in the DPB being marked as "unused for reference" or "used for long-term reference".

NOTE 1—The RPS is an absolute description of the reference pictures used in the decoding process of the current and future coded pictures. The RPS signalling is explicit in the sense that all reference pictures included in the RPS are listed explicitly.

A decoded picture in the DPB can be marked as "unused for reference", "used for short-term reference", or "used for long-term reference", but only one among these three at any given moment during the operation of the decoding process. Assigning one of these markings to a picture implicitly removes another of these markings when applicable. When a picture is referred to as being marked as "used for reference", this collectively refers to the picture being marked as "used for short-term reference" or "used for long-term reference" (but not both).

When the current picture is an IRAP picture with NoRaslOutputFlag equal to 1, all reference pictures currently in the DPB (if any) are marked as "unused for reference".

Short-term reference pictures are identified by their PicOrderCntVal values. Long-term reference pictures are identified either by their PicOrderCntVal values or their slice_pic_order_cnt_lsb values.

Five lists of picture order count values are constructed to derive the RPS. These five lists are PocStCurrBefore, PocStCurrAfter, PocStFoll, PocLtCurr, and PocLtFoll, with NumPocStCurrBefore, NumPocStCurrAfter, NumPocStFoll, NumPocLtCurr, and NumPocLtFoll number of elements, respectively. The five lists and the five variables are derived as follows:

If the current picture is an IDR picture, PocStCurrBefore, PocStCurrAfter, PocStFoll, PocLtCurr, and PocLtFoll are all set to be empty, and NumPocStCurrBefore, NumPocStCurrAfter, NumPocStFoll, NumPocLtCurr, and NumPocLtFoll are all set equal to 0.

Otherwise, the following applies:

```
        for( i = 0, j = 0, k = 0; i < NumNegativePics[ CurrRpsIdx ] ; i++ )
    if( UsedByCurrPicS0[ CurrRpsIdx ][ i ] )
        PocStCurrBefore[ j++ ] = PicOrderCntVal + DeltaPocS0[ CurrRpsIdx ][ i ]
    else
        PocStFoll[ k++ ] = PicOrderCntVal + DeltaPocS0[ CurrRpsIdx ][ i ]
NumPocStCurrBefore = j
for( i = 0, j = 0; i < NumPositivePics[ CurrRpsIdx ]; i++ )
    if( UsedByCurrPicS1[ CurrRpsIdx ][ i ] )
        PocStCurrAfter[ j++ ] = PicOrderCntVal + DeltaPocS1[ CurrRpsIdx ][ i ]
    else
        PocStFoll[ k++ ] = PicOrderCntVal + DeltaPocS1[ CurrRpsIdx ][ i ]
NumPocStCurrAfter = j
NumPocStFoll = k          (8-5)
for( i = 0, j = 0, k = 0; i < num_long_term_sps + num_long_term_pics; i++ ) {
    pocLt = PocLsbLt[ i ]
    if( delta_poc_msb_present_flag[ i ] )
        pocLt += PicOrderCntVal - DeltaPocMsbCycleLt[ i ] *
MaxPicOrderCntLsb -
            PicOrderCntVal & ( MaxPicOrderCntLsb - 1 )
    if( UsedByCurrPicLt[ i ] ) {
        PocLtCurr[j ] = pocLt
        CurrDeltaPocMsbPresentFlag[ j++ ] = delta_poc_msb_present_flag[ i ]
    } else {
        PocLtFoll[ k ] = pocLt
        FollDeltaPocMsbPresentFlag[ k++ ] = delta_poc_msb_present_flag[ i ]
    }
}
NumPocLtCurr = j
NumPocLtFoll = k
``` where PicOrderCntVal is the picture order count of the current picture as specified in subclause 8.3.1.

NOTE 2—A value of CurrRpsIdx in the range of 0 to num_short_term_ref_pic_sets−1, inclusive, indicates that a candidate short-term RPS from the active SPS is being used, where CurrRpsIdx is the index of the candidate short-term RPS into the list of candidate short-term RPSs signalled in the active SPS. CurrRpsIdx equal to num_short_term_ref_pic_sets indicates that the short-term RPS of the current picture is directly signalled in the slice header.

For each i in the range of 0 to NumPocLtCurr−1, inclusive, when CurrDeltaPocMsbPresentFlag[i] is equal to 1, it is a requirement of bitstream conformance that the following conditions apply:

EXAMPLE 2

The following description refers to a second example in accordance with this disclosure. The syntax and semantics below, in general, refer to corresponding sections in HEVC WD10. As mentioned above, italicized text indicates proposed additions and [removed: " "] indicates proposed deletions.

The general slice segment header syntax and semantics are first described below.

General Slice Segment Header Syntax

| | Descriptor |
|---|---|
| slice_segment_header( ) { | |
| ... | |

-continued

| | Descriptor |
|---|---|
| if( ! dependent_slice_segment_flag ) { | |
| *poc_reset_flag* | *u(1)* |
| for ( i = *1* [removed: "0"]; i < num_extra_slice_header_bits; i++ ) | |
| slice_reserved_flag[ i ] | u(1) |
| ... | |
| } | |

Alternatively, the syntax may be as follows:

| | Descriptor |
|---|---|
| slice_segment_header( ) { | |
| ... | |
|   if( !dependent_slice_segment_flag ) { | |
|     numRsvBitsUsed = 0 | |
|     if( nal_unit_type != IDR_W_RADL && nal_unit_type != IDR_N_LP ) { | |
|       poc_reset_flag | u(1) |
|       numRsvBitsUsed = 1 | |
|     } | |
|     for( i = numRsvBitsUsed [removed: "0"]; i < num_extra_slice_header_bits; i++ ) | |
|       slice_reserved_flag[ i ] | u(1) |
|     ... | ue(v) |
| } | |

The general slice segment header semantics are described below.

General Slice Segment Header Semantics poc_reset_flag equal to 1 specifies that the derived picture order count for the current picture is equal to 0. poc_reset_flag equal to 0 specifies that the derived picture order count for the current picture may or may not be equal to 0.

When present, the value of poc_reset_flag shall be equal to 1 when the current picture is not an IDR picture and at least one picture in the current access unit is an IDR picture.

When not present, the value of poc_reset_flag is inferred to be equal to 0.

Accordingly, video encoder 20 may set poc_reset_flag to have a value of 1 for a picture that is not an IRAP picture and that is in an access unit that includes an TRAP picture, e.g., in a different video coding layer. Likewise, video decoder 30, upon receiving a value of 1 for a picture that is not an IRAP picture, may reset the POC value of the picture, and adjust POC values of other pictures in the same layer and the same coded video sequence as needed.

Proposed decoding process changes in accordance with this second example are described below.

Decoding Process Changes

Slice Decoding Process 8.3.1 Decoding Process for Picture Order Count

Output of this process is PicOrderCntVal, the picture order count of the current picture. Picture order counts are used to identify pictures, for deriving motion parameters in merge mode and motion vector prediction, and for decoder conformance checking (see subclause C.5).

Each coded picture is associated with a picture order count variable, denoted as PicOrderCntVal.

When the current picture is not an IRAP picture with NoRaslOutputFlag equal to 1, the variables prevPicOrderCntLsb and prevPicOrderCntMsb are derived as follows:

Let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and prevPicOrderCnt be equal to PicOrderCntVal of prevTid0Pic.

The variable prevPicOrderCntLsb is set equal to prevPicOrderCnt & (MaxPicOrderCntLsb−1) [removed: "slice_pic_order_cnt_lsb of prevTid0Pic"].

The variable prevPicOrderCntMsb is set equal to prevPicOrderCnt−prevPicOrderCntLsb [removed: "PicOrderCntMsb of prevTid0Pic"].

The variable PicOrderCntMsb of the current picture is derived as follows:

If the current picture is an IRAP picture with NoRaslOutputFlag equal to 1, PicOrderCntMsb is set equal to 0.
Otherwise, PicOrderCntMsb is derived as follows:

```
if( ( slice_pic_order_cnt_lsb < prevPicOrderCntLsb ) &&
      ( ( prevPicOrderCntLsb − slice_pic_order_cnt_lsb ) >= (
MaxPicOrderCntLsb / 2 ) ) )
    PicOrderCntMsb = prevPicOrderCntMsb + MaxPicOrderCntLsb
      (8-1)
else if( (slice_pic_order_cnt_lsb > prevPicOrderCntLsb ) &&
      ( (slice_pic_order_cnt_lsb − prevPicOrderCntLsb ) >
      ( MaxPicOrderCntLsb
/ 2 ) ) )
    PicOrderCntMsb = prevPicOrderCntMsb − MaxPicOrderCntLsb
else
    PicOrderCntMsb = prevPicOrderCntMsb
```

PicOrderCntVal is derived as follows:
PicOrderCntVal=PicOrderCntMsb+slice_pic_order_cnt_lsb (8-2)

NOTE 1—All IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

When poc_reset_flag is equal to 1, the following apply in order:

PicOrderCntVal of each picture that is in the DPB and belongs to the same layer as the current picture is decremented by PicOrderCntVal.

PicOrderCntVal is set to 0.

The value of PicOrderCntVal shall be in the range of $-2^{31}$ to $2^{31}-1$, inclusive. In one CVS, the PicOrderCntVal values for any two coded pictures in the same layer shall not be the same.

The function PicOrderCnt(picX) is specified as follows:
PicOrderCnt(picX)=PicOrderCntVal of the picture picX (8-3)

The function DiffPicOrderCnt(picA, picB) is specified as follows:
DiffPicOrderCnt(picA, picB)=PicOrderCnt(picA)−PicOrderCnt(picB) (8-4)

The bitstream shall not contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

The decoding process for the reference picture set in this example may be the same as described for Example 1.

In this manner, video encoder 20 may be configured to set a value for a syntax element (e.g., poc_msb_reset_flag or poc_reset_flag) that indicates whether at least a portion of a POC value for a picture is to be reset. As discussed above, video encoder 20 may be configured to set the value for the syntax element to indicate that the POC value is to be reset when the picture is included in an access unit that includes at least one TRAP picture. Video decoder 30, likewise, may determine from the value of the syntax element whether to reset at least a portion of a POC value (or the entire POC value) of a picture. For instance, where the syntax element is the poc_msb_reset_flag, video decoder 30 may reset MSBs of the POC value of the picture. When the syntax element is the poc_reset_flag, video decoder 30 may reset the entire POC value of the picture.

Additionally, video encoder 20 and video decoder 30 may adjust POC values of other pictures in the same layer and in the same coded video sequence (CVS), such that differences between the POC values relative to the POC value to be adjusted remain constant before the reset and after. In this manner, when video encoder 20 encodes a block of a picture using inter-layer prediction, where the picture (after the POC adjustment discussed above) has a POC value of N, the block may identify the reference picture using the POC value of N. That is, following the adjustment, each picture in an access unit will have the same POC value.

Moreover, video decoder 30 may be configured to detect boundaries of access units.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 each may operate, in general, in conformance with HEVC WD10, MV-HEVC WD3, and/or SHVC WD1, as described above, or with other similar standards or extensions in which the techniques described in this disclosure may be useful. The HEVC standard specifies several additional capabilities of video coding devices relative to existing devices according to, e.g., ITU-T H.264/AVC. For example, whereas H.264 provides nine intra-prediction encoding modes, the HEVC standard may provide as many as thirty-three intra-prediction encoding modes.

In general, a video frame or picture may be divided into a sequence of treeblocks or largest coding units (LCU) that include both luma and chroma samples. A treeblock in the HEVC coding process has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 (L0) or RefPicList1 (L1)) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

For example, for video coding according to the HEVC standard, a video frame may be partitioned into coding units (CUs), prediction units (PUs), and transform units (TUs). A CU generally refers to an image region that serves as a basic unit to which various coding tools are applied for video compression. A CU typically has a square geometry, and may be considered to be similar to a so-called "macroblock" under other video coding standards, such as, for example, ITU-T H.264.

To achieve better coding efficiency, a CU may have a variable size depending on the video data it contains. That is, a CU may be partitioned, or "split" into smaller blocks, or sub-CUs, each of which may also be referred to as a CU. In addition, each CU that is not split into sub-CUs may be further partitioned into one or more PUs and TUs for purposes of prediction and transform of the CU, respectively.

PUs may be considered to be similar to so-called partitions of a block under other video coding standards, such as H.264. PUs are the basis on which prediction for the block is performed to produce "residual" coefficients. Residual coefficients of a CU represent a difference between video data of the CU and predicted data for the CU determined using one or more PUs of the CU. Specifically, the one or more PUs specify how the CU is partitioned for the purpose of prediction, and which prediction mode is used to predict the video data contained within each partition of the CU.

One or more TUs of a CU specify partitions of a block of residual coefficients of the CU on the basis of which a transform is applied to the block to produce a block of residual transform coefficients for the CU. The one or more TUs may also be associated with the type of transform that is applied. The transform converts the residual coefficients from a pixel, or spatial domain to a transform domain, such as a frequency domain. In addition, the one or more TUs may specify parameters on the basis of which quantization is applied to the resulting block of residual transform coefficients to produce a block of quantized residual transform coefficients. The residual transform coefficients may be quantized to possibly reduce the amount of data used to represent the coefficients.

A CU generally includes one luminance component, denoted as Y, and two chrominance components, denoted as U and V. In other words, a given CU that is not further split into sub-CUs may include Y, U, and V components, each of which may be further partitioned into one or more PUs and TUs for purposes of prediction and transform of the CU, as previously described. For example, depending on the video sampling format, the size of the U and V components, in terms of a number of samples, may be the same as or different than the size of the Y component. As such, the techniques described above with reference to prediction, transform, and quantization may be performed for each of the Y, U, and V components of a given CU.

To encode a CU, one or more predictors for the CU are first derived based on one or more PUs of the CU. A predictor is a reference block that contains predicted data for the CU, and is derived on the basis of a corresponding PU for the CU, as previously described. For example, the PU indicates a partition of the CU for which predicted data is to be determined, and a prediction mode used to determine the predicted data. The predictor can be derived either through intra- (I) prediction (i.e., spatial prediction) or inter- (P or B) prediction (i.e., temporal prediction) modes. Hence, some CUs may be intra-coded (I) using spatial prediction with respect to neighboring reference blocks, or CUs, in the same frame, while other CUs may be inter-coded (P or B) with respect to reference blocks, or CUs, in other frames.

Upon identification of the one or more predictors based on the one or more PUs of the CU, a difference between the original video data of the CU corresponding to the one or more PUs and the predicted data for the CU contained in the one or more predictors is calculated. This difference, also referred to as a prediction residual, comprises residual coefficients, and refers to pixel differences between portions of the CU specified by the one or more PUs and the one or more predictors, as previously described. The residual coefficients are generally arranged in a two-dimensional (2-D) array that corresponds to the one or more PUs o the CU.

To achieve further compression, the prediction residual is generally transformed, e.g., using a discrete cosine transform (DCT), integer transform, Karhunen-Loeve (K-L) transform, or another transform. The transform converts the prediction residual, i.e., the residual coefficients, in the spatial domain to residual transform coefficients in the transform domain, e.g., a frequency domain, as also previously described. The transform coefficients are also generally arranged in a 2-D array that corresponds to the one or more TUs of the CU. For further compression, the residual transform coefficients may be quantized to possibly reduce the amount of data used to represent the coefficients, as also previously described.

To achieve still further compression, an entropy coder subsequently encodes the resulting residual transform coefficients, using Context Adaptive Binary Arithmetic Coding (CABAC), Context Adaptive Variable Length Coding (CAVLC), Probability Interval Partitioning Entropy Coding (PIPE), or another entropy coding methodology. Entropy coding may achieve this further compression by reducing or removing statistical redundancy inherent in the video data of the CU, represented by the coefficients, relative to other CUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 and video decoder 30 may be configured to implement the example techniques of this disclosure. Video encoder 20 and video decoder 30 may be commonly referred to as a video coder.

For example, video decoder 30 may be configured to receive a first syntax element that specifies whether a picture order count (POC) value of a current picture is reset to be equal to a set of the least significant bits (LSBs) of the POC value of the current picture, when the first syntax element specifies that the POC value of the current picture is reset to be equal to the set of LSB's of the POC value of the current picture, decrement POC values of other pictures in a same coding layer as the current picture so that the difference between the POC value of the current picture and the POC value of any of the pictures in the same layer remains the same as before the POC value of the current picture was reset, and decode at least some of the current picture and the other pictures using the decremented POC values. The other pictures may include short-term reference pictures and long-term reference pictures, and video decoder 30 may decrement the POC values for the short-term reference pictures and for the long-term reference pictures.

When the first syntax element specifies that POC value of the current picture is reset to be equal to the set of POC value LSB's, video decoder 30 may decrement POC values of other pictures in a decoded picture buffer (DPB) so that the difference between the POC value of the current picture and the POC value of any of the pictures in the DPB remains the same as before the POC value of the current picture was reset.

When the first syntax element specifies that the POC value of the current picture is reset to be equal to the set of LSB's of the POC value of the current picture, the most significant bits (MSB's) of the POC value of the current picture are reset to zero. In an example, the LSB's and MSB's of the POC value of the current picture are mutually exclusive.

In some examples, video decoder 30 may receive a second syntax element that specifies whether the LSB's of the POC value of the current picture are reset to zero. The first and/or second syntax element may each be a flag, and one or both of the syntax elements may be received in a slice header. The current picture may comprise one of an IDR, CRA or BLA picture.

In another example, video decoder 30 may be configured to receive a first syntax element that specifies whether a picture order count (POC) value of a current picture is reset to be equal to zero, when the first syntax element specifies that the POC value of the current picture is reset to be equal to zero, if the current picture is in a layer greater than layer 0, reset the current picture to be equal to zero, and decode the current picture using the reset POC value.

In one example, the current picture is a non-IDR picture. The syntax element may comprise a flag, such as an idr_au_present_flag. The syntax element may be received in a slice header. When the current picture is an IDR picture, the syntax element always specifies that the POC value of the current picture is reset to be equal to zero.

Video encoder 20 also may be configured to perform methods in accordance with the examples of this disclosure. For example, video encoder 20 may be configured to generate a first syntax element that specifies whether a picture order count (POC) value of a current picture is reset to be equal to a set of the least significant bits (LSBs) of the POC value of the current picture, when the first syntax element specifies that the POC value of the current picture is reset to be equal to the set of LSB's of the POC value of the current picture, decrement POC values of other pictures in a same coding layer as the current picture so that the difference between the POC value of the current picture and the POC value of any of the pictures in the same layer remains the same as before the POC value of the current picture was reset, and encode at least some of the current picture and the other pictures using the decremented POC values.

When the first syntax element specifies that the POC value of the current picture is reset to be equal to the set of POC value LSB's, video encoder 20 may decrement POC values of other pictures in a decoded picture buffer (DPB) so that the difference between the POC value of the current picture and the POC value of any of the pictures in the DPB remains the same as before the POC value of the current picture was reset.

When the first syntax element specifies that the POC value of the current picture is reset to be equal to the set of LSB's of the POC value of the current picture, the most significant bits (MSB's) of the POC value of the current picture are reset to zero. In an example, the LSB's and MSB's of the POC value of the current picture are mutually exclusive.

Video encoder 20 may generate a second syntax element that specifies whether the LSB's of the POC value of the current picture are reset to zero. The first and/or second syntax element may each be a flag, and one or both of the syntax elements may be received in a slice header. The current picture may comprise one of an IDR, CRA or BLA picture.

In another example, video encoder 20 may be configured to generate a first syntax element that specifies whether a picture order count (POC) value of a current picture is reset to be equal to zero, when the first syntax element specifies that the POC value of the current picture is reset to be equal to zero, if the current picture is in a layer greater than layer 0, reset the current picture to be equal to zero, and encode the current picture using the reset POC value. The current picture may be a non-IDR picture. The syntax element may comprise a flag, such as an idr_au_present_flag, and the flag may be signaled in a slice header. When the picture is an IDR picture, the syntax element always specifies that the POC value of the current picture is reset to be equal to zero.

Figure 2:
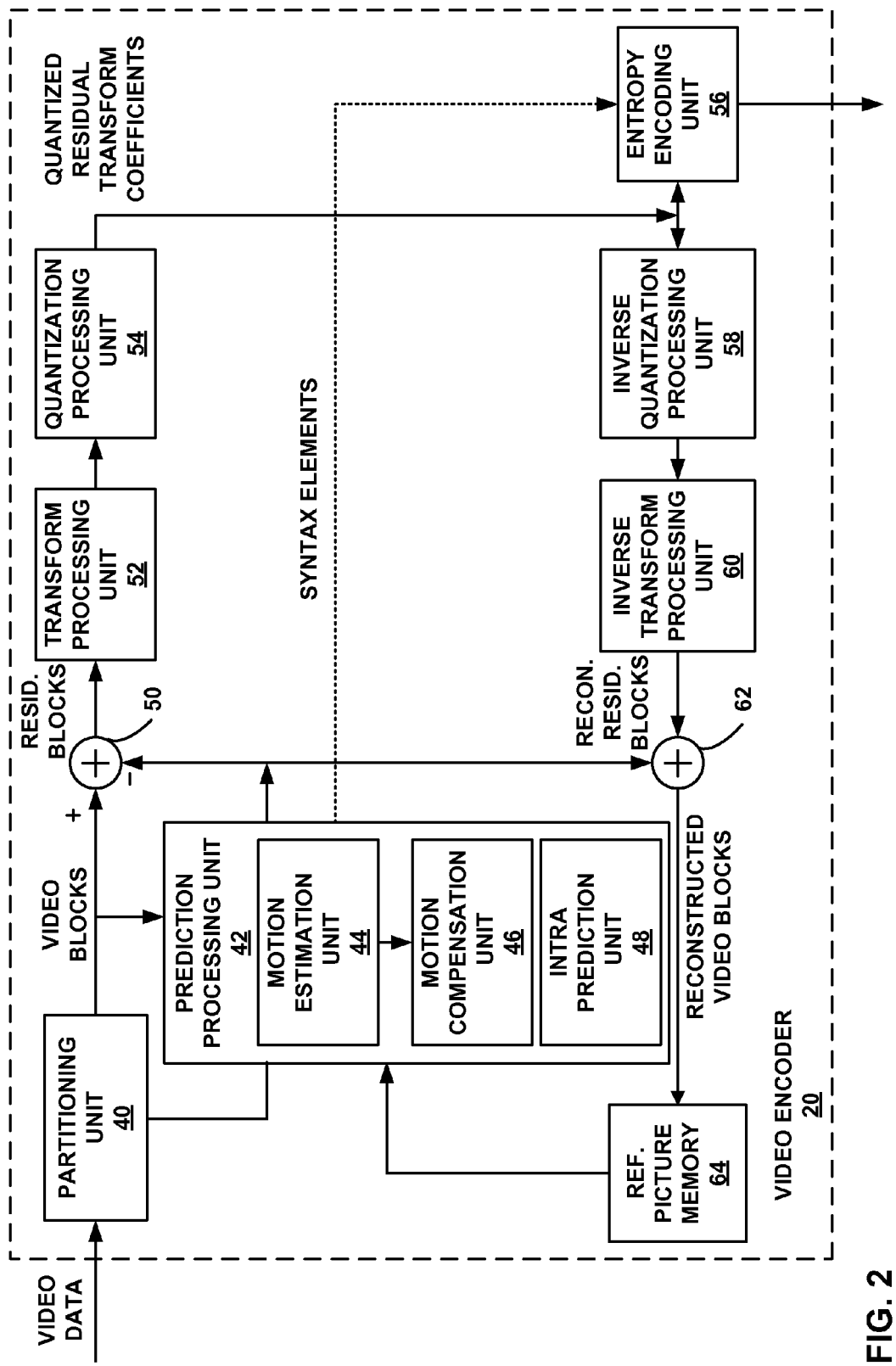
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 40, prediction processing unit 42, reference picture memory 64, summer 50, transform processing unit 52, quantization processing unit 54, and entropy encoding unit 56. Prediction processing unit 42 includes motion estimation unit 44, motion compensation unit 46, and intra prediction unit 48. For video block reconstruction, video encoder 20 also includes inverse quantization processing unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

In various examples, a unit of video encoder 20 may be tasked to perform the techniques of this disclosure. Also, in some examples, the techniques of this disclosure may be divided among one or more of the units of video encoder 20.

As shown in FIG. 2, video encoder 20 receives video data, and partitioning unit 40 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes or one of a plurality of inter coding modes, for the current video block based on error results (e.g., coding rate and the level of distortion). Prediction processing unit 42 may provide the resulting intra- or inter-coded block to summer 50 to generate residual block data and to summer 62 to reconstruct the encoded block for use as a reference picture.

Intra prediction unit 48 within prediction processing unit 42 may perform intra-predictive coding of the current video block relative to one or more neighboring blocks in the same picture or slice as the current block to be coded to provide spatial compression. Motion estimation unit 44 and motion compensation unit 46 within prediction processing unit 42 perform inter-predictive coding of the current video block relative to one or more predictive blocks in one or more reference pictures to provide temporal compression.

Motion estimation unit 44 may be configured to determine the inter-prediction mode for a video slice according to a predetermined pattern for a video sequence. Motion estimation unit 44 and motion compensation unit 46 may be highly integrated, but are illustrated separately for conceptual purposes. Motion estimation, performed by motion estimation unit 44, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 44 may perform a motion search relative to the full pixel positions and fractional pixel positions and output a motion vector with fractional pixel precision.

Motion estimation unit 44 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 44 sends the calculated motion vector to entropy encoding unit 56 and motion compensation unit 46.

Motion compensation, performed by motion compensation unit 46, may involve fetching or generating the predictive block based on the motion vector determined by motion estimation, possibly performing interpolations to sub-pixel precision. Upon receiving the motion vector for the PU of the current video block, motion compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 46 may also generate syntax elements associated with the video blocks and the video slice for use by video decoder 30 in decoding the video blocks of the video slice.

Furthermore, in some cases, prediction processing unit 42 may determine to predict a block of a picture using inter-layer prediction. For example, for multi-view video data, prediction processing unit 42 may determine to predict a block of a picture of one view from a picture of another view using inter-view prediction. In the case of inter-view prediction, motion estimation unit 44 may calculate a disparity motion vector for the block, where the disparity motion vector generally identifies the position of a reference block in a picture of a reference view. As another example, for scalable video coding, prediction processing unit 42 may determine to predict a block of a picture of one layer from a picture of another layer using inter-layer prediction.

Inter-layer prediction (which includes inter-view prediction, in that views may be considered one type of layer) may involve the use of motion vectors that point to reference blocks in different layers, rather than blocks in the same layer but in pictures of different temporal instances. Typically, inter-layer prediction is performed using pictures of the same access unit as a picture including a block to be predicted using inter-layer prediction. Motion parameters for an inter-predicted block may therefore identify a reference picture using, e.g., a picture order count (POC) value.

Typically, the techniques of inter-layer coding extensions (e.g., multiview and scalable extensions to HEVC) have been based on the assumption that POC values are aligned, that is, that all pictures in the same access unit have the same POC value. In order to achieve this, conventional techniques have also aligned intra random access point (TRAP) pictures. However, as noted above, forcing alignment of IRAP pictures hinders certain advantageous usage scenarios.

Therefore, in accordance with the techniques of this disclosure, prediction processing unit 42 does not necessarily align all IRAP pictures between different layers. That is, prediction processing unit 42 may determine to code at least one picture of an access unit that includes an IRAP picture as a non-TRAP picture. However, prediction processing unit 42 may use the techniques of this disclosure to achieve non-alignment of IRAP pictures while maintaining aligning POC values between pictures of different layers. In this manner, prediction processing unit 42 may ensure that inter-layer predicted blocks of pictures can properly refer to reference pictures in different layers where the reference pictures have the same POC values as the pictures including the inter-layer predicted blocks, without aligning IRAP pictures.

In particular, in accordance with the techniques of this disclosure, prediction processing unit 42 may receive a picture to be encoded for an access unit that includes an IRAP picture. That is, video encoder 20 may have previously encoded a base layer (or other layer) including the IRAP picture, and determined to encode the IRAP picture as an IRAP picture, e.g., an IDR, CRA, or BLA picture. However, video encoder 20 may then determine to encode a collocated picture (that is, a picture in the same access unit) in another layer as a non-IRAP picture.

After determining to encode a picture as a non-TRAP picture that is in the same access unit as an IRAP picture, video encoder 20 may set a value for a syntax element that indicates that at least a portion of a POC value for the non-IRAP picture is to be reset to a value of zero. The at least portion of the POC value may include only most significant bits (MSBs) of the POC value, or the entire POC value (i.e., all bits of the POC value). The syntax element may comprise, for example, the poc_msb_reset_flag of Example 1 above or the poc_reset_flag of Example 2 above.

Video encoder 20 may also reset the POC value for the picture after determining to encode the picture as a non-TRAP picture. Furthermore, video encoder 20 may reset POC values of pictures in reference picture memory 64 that are in the same layer as the picture and in the same coded video sequence as the picture. In particular, resetting the POC values of these pictures may include ensuring that differences between the POC value for the current picture and the POC values for these other pictures remain the same before and after the reset. Thus, if a picture in reference picture memory 64 has a POC value difference relative to the POC value of the current picture of N, video encoder 20 may reset the POC value of the picture in reference picture memory 64 such that the POC value is equal to the reset POC value of the current picture minus N.

In this manner, when encoding subsequent pictures (e.g., pictures of the same layer or subsequently encoded layers) using inter-layer prediction, video encoder 20 may encode syntax data that identifies a reference picture using a POC value for the reference picture that is equal to a POC value for a picture including an inter-layer predicted block that refers to the reference picture.

Intra prediction unit 48 may intra-predict a current block, as an alternative to the inter-prediction performed by motion estimation unit 44 and motion compensation unit 46, as described above. In particular, intra prediction unit 48 may determine an intra-prediction mode to use to encode a current block. In some examples, intra prediction unit 48 may encode a current block using various intra-prediction modes, e.g., during separate encoding passes, and intra prediction unit 48 may select an appropriate intra-prediction mode to use from the tested modes. For example, intra prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction unit 48 may calculate ratios from the distortions and rates for the various encoded blocks to determine which intra-prediction mode exhibits the best rate-distortion value for the block.

In any case, after selecting an intra-prediction mode for a block, intra prediction unit 48 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion compensation unit 46 may calculate a reference block by adding the residual block to a predictive block of one of the reference pictures within one of the reference picture lists. Motion compensation unit 46 may also apply one or more interpolation filters to the reconstructed residual block to calculate sub-integer pixel values for use in motion estimation. Summer 62 adds the reconstructed residual block to the motion compensated prediction block produced by motion compensation unit 46 to produce a reference block for storage in reference picture memory 64. The reference block may be used by motion estimation unit 44 and motion compensation unit 46 as a reference block to inter-predict a block in a subsequent video frame or picture.

In this manner, video encoder 20 represents an example of a video coder configured to code a value for a syntax element indicating whether at least a portion of a picture order count (POC) value of a picture is to be reset to a value of zero, when the value for the syntax element indicates that the portion of the POC value is to be reset to the value of zero, reset at least the portion of the POC value such that the portion of the POC value is equal to zero, and code video data using the reset POC value.

Figure 3:
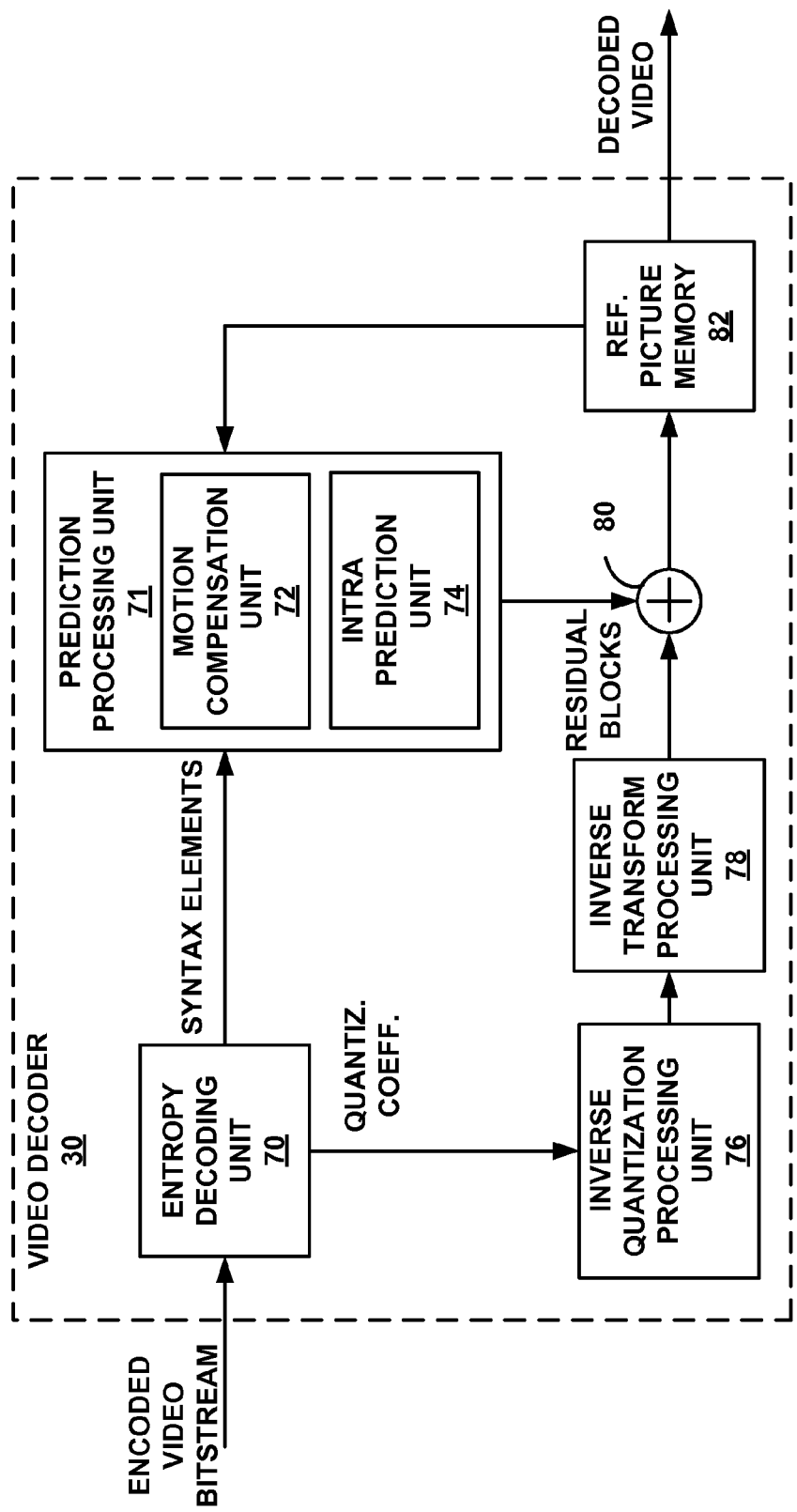
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 70, prediction processing unit 71, inverse quantization processing unit 76, inverse transformation unit 78, summer 80, and reference picture memory 82. Prediction processing unit 71 includes motion compensation unit 72 and intra prediction unit 74. Video decoder 30 may, in some examples, perform a decoding pass generally reciprocal to the encoding pass described with respect to video encoder 20 from FIG. 2.

In various examples, a unit of video decoder 30 may be tasked with performing the techniques of this disclosure. Also, in some examples, the techniques of this disclosure may be divided among one or more of the units of video decoder 30.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra prediction unit 74 of prediction processing unit 71 may generate prediction data for a video block of the current video slice based on a signaled intra prediction mode and data from previously decoded blocks of the current frame or picture. When the video picture is coded as an inter-coded (i.e., B or P) slice, motion compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques or any other technique based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, entropy decoding unit 70 may decode a value for a syntax element that indicates whether at least a portion of a first picture order count (POC) value of a picture is to be reset to a value of zero. The syntax element may comprise, for example, the poc_msb_reset_flag of Example 1 as described above or the poc_reset_flag of Example 2 as described above. Video decoder 30 may then reset the at least portion of the POC value when the syntax element has a value indicating that the POC value is to be reset. For instance, video decoder 30 may set bits for the at least portion (e.g., most significant bits for poc_msb_reset_flag or all bits for the poc_reset_flag) of the POC value equal to zero.

Furthermore, video decoder 30 may adjust POC values of other pictures in reference picture memory 82 as well (that is, those pictures that are in the same video coding layer and the same coded video sequence). For example, video decoder 30 may decrement POC values of the other pictures such that differences between the POC values and the POC value for which the reset was signaled remain the same as before the reset. Thus, if a picture in reference picture memory 82 has a POC value difference relative to the POC value of the current picture of N, video decoder 30 may reset the POC value of the picture in reference picture memory 82 such that the POC value is equal to the reset POC value of the current picture minus N.

In general, video blocks that are inter-predicted may include syntax elements that identify reference blocks, whether the inter-prediction is temporal or inter-layer (e.g., inter-view). In accordance with the techniques of this disclosure, syntax elements for inter-predicted blocks may identify a reference picture using a POC value of the reference picture following a reset as discussed above. Thus, video decoder 30 need not adjust POC values that identify reference pictures when signaled as motion information for the purposes of inter-prediction.

Inverse quantization processing unit 76 inverse quantizes, i.e., de quantizes, the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In some examples, one or more aspects of the techniques described in this disclosure may be performed by an intermediate network device such as a media aware network element (MANE), a stream adaptation processor, a splicing processor, or an editing processor. For example, such an intermediate device may be configured to generate any of a variety signaling as described in this disclosure. For example, such an intermediate device may be configured to receive a first syntax element that specifies whether a picture order count (POC) value of a current picture is reset to be equal to a set of the least significant bits (LSBs) of the POC value of the current picture, when the first syntax element specifies that the POC value of the current picture is reset to be equal to the set of LSB's of the POC value of the current picture, decrement POC values of other pictures in a same coding layer as the current picture so that the difference between the POC value of the current picture and the POC value of any of the pictures in the same layer remains the same as before the POC value of the current picture was reset, and decode at least some of the current picture and the other pictures using the decremented POC values.

In another example, such an intermediate device may be configured to receive a first syntax element that specifies whether a picture order count (POC) value of a current picture is reset to be equal to zero, when the first syntax element specifies that the POC value of the current picture is reset to be equal to zero, if the current picture is in a layer greater than layer 0, reset the current picture to be equal to zero, and decode the current picture using the reset POC value.

In this manner, video decoder 30 represents an example of a video coder configured to code a value for a syntax element indicating whether at least a portion of a picture order count (POC) value of a picture is to be reset to a value of zero, when the value for the syntax element indicates that the portion of the POC value is to be reset to the value of zero, reset at least the portion of the POC value such that the portion of the POC value is equal to zero, and code video data using the reset POC value.

Figure 4:
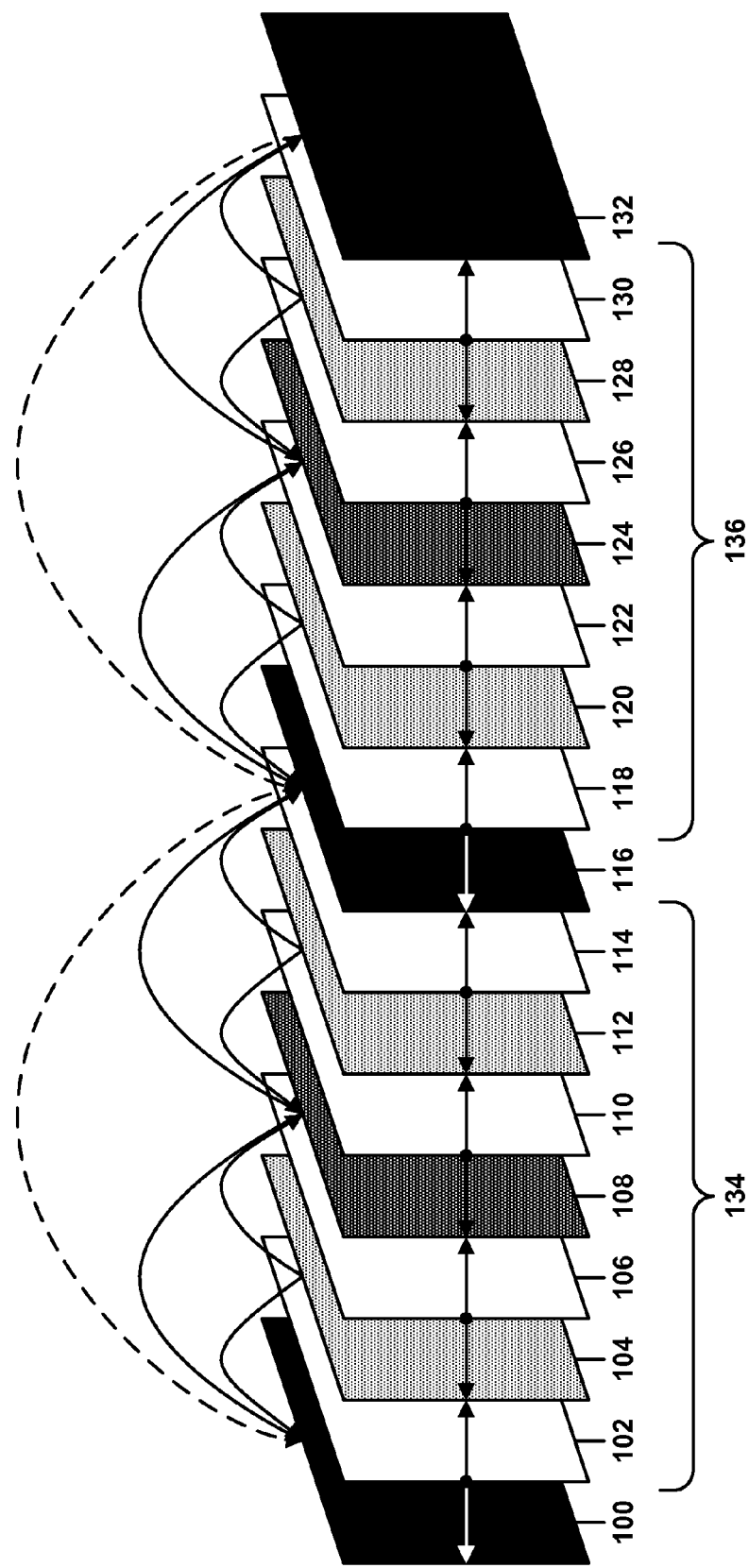
FIG. 4 is a conceptual diagram illustrating a sequence of coded video pictures.

FIG. 4 is a conceptual diagram illustrating a sequence of coded video pictures 100-132. The pictures are shaded differently to indicate positions within a hierarchical prediction structure. For example, pictures 100, 116, and 132 are shaded black to represent that pictures 100, 116, 132 are at the top of the hierarchical prediction structure. Pictures 100, 116, 132 may comprise, for example, intra-coded pictures or inter-coded pictures that are predicted from other pictures in a single direction (e.g., P-pictures). When intra-coded, pictures 100, 116, 132 are predicted solely from data within the same picture. When inter-coded, picture 116, for example, may be coded relative to data of picture 100, as indicated by the dashed arrow from picture 116 to picture 100. Pictures 116, 132 form key pictures of groups of pictures (GOPs) 134, 136, respectively.

Pictures 108, 124 are darkly shaded to indicate that they are next in the encoding hierarchy following pictures 100, 116, and 132. Pictures 108, 124 may comprise bi-directional, inter-mode prediction encoded pictures. For example, picture 108 may be predicted from data of pictures 100 and 116, while picture 124 may be predicted from pictures 116 and 132. Pictures 104, 112, 120, and 128 are lightly shaded to indicate that they are next in the encoding hierarchy following pictures 108 and 124. Pictures 104, 112, 120, and 128 may also comprise bi-directional, inter-mode prediction encoded pictures. For example, picture 104 may be predicted from pictures 100 and 108, picture 112 may be predicted from pictures 108 and 116, picture 120 may be predicted from picture 116 and 124, and picture 128 may be predicted from picture 124 and 132.

Finally, pictures 102, 106, 110, 114, 118, 122, 126, and 130 are shaded white to indicate that these pictures are last in the encoding hierarchy. Pictures 102, 106, 110, 114, 118, 122, 126, and 130 may be bi-directional, inter-mode prediction encoded pictures. Picture 102 may be predicted from pictures 100 and 104, picture 106 may be predicted from pictures 104 and 108, picture 110 may be predicted from pictures 108 and 112, picture 114 may be predicted from pictures 112 and 116, picture 118 may be predicted from picture 116 and 120, picture 122 may be predicted from pictures 120 and 124, picture 126 may be predicted from pictures 124 and 128, and picture 130 may be predicted from pictures 128 and 132.

Pictures 100-132 are illustrated in display order. That is, following decoding, picture 100 is displayed before picture 102, picture 102 is displayed before picture 104, and so on. However, due to the encoding hierarchy, pictures 100-132 may be decoded in a different order. Moreover, after being encoded, pictures 100-132 may be arranged in decoding order in a bitstream including encoded data for pictures 100-132. For example, picture 116 may be displayed last among pictures of GOP 134. However, due to the encoding hierarchy, picture 116 may be decoded first of GOP 134. That is, in order to properly decode picture 108, for example, picture 116 may need to be decoded first, in order to act as a reference picture for picture 108. Likewise, picture 108 may act as a reference picture for pictures 104, 106, 110, and 112, and therefore may need to be decoded before pictures 104, 106, 110, and 112.

The time at which a picture is displayed may be referred to as presentation time, whereas the time at which the picture is decoded may be referred to as decoding time. Decoding times and presentation times generally provide indications of temporal ordering relative to other pictures of the same sequence. The difference between a picture's decoding time and the picture's presentation time may be referred to as picture reordering delay for the picture.

In accordance with the techniques of this disclosure, a video coder (e.g., video encoder 20 and/or video decoder 30) may adjust POC values for pictures in a video coding layer when one of the pictures is a non-IRAP picture that is included in an access unit that also includes an IRAP picture (of a different video coding layer). For example, suppose that picture 132 is a P-picture and is collocated with (that is, included in the same access unit as) a picture of another video coding layer that is an TRAP picture. In this example, picture 132 would be a non-TRAP picture (because it is inter-coded) that is included in the same access unit as an TRAP picture.

Consequently, continuing the example set forth above, the video coder would code a value for a syntax element indicating that a POC value for picture 132 is to be reset. That is, the syntax element would indicate that at least a portion of the POC value for picture 132 is to be reset (to a value of zero). Accordingly, the video coder may adjust the POC value of picture 132. For instance, according to Example 1 discussed above in which the syntax element is poc_msb_reset_flag, the video coder would set the most significant bits (MSBs) of the POC value of picture 132 equal to zero. As another example, according to Example 2 discussed above in which the syntax element is poc_reset_flag, the video coder would set the entire POC value of picture 132 equal to zero.

The video coder may also adjust POC values of other pictures. For example, assuming that pictures 100 and 116 were previously coded, the video coder may adjust POC values of pictures 100 and 116 based on the reset POC value for picture 132. In the example of FIG. 4, the POC value of picture 132 is eight larger than the POC value of picture 116 and sixteen larger than the POC value of picture 100. In Example 2, where the entire POC value is reset, the video coder may adjust the POC value of picture 100 to be equal to −16 (negative sixteen), and the POC value of picture 116 to be equal to −8 (negative eight). In this manner, differences between the POC values of picture 132 and pictures 100 and 116 may remain constant after the POC value reset, relative to before the POC value reset.

The example above explained modifying the POC values of pictures 100 and 116 based on an assumption that these pictures would already be present in a decoded picture buffer (DPB) when coding picture 132. In some cases, pictures 102-114 may also be present in the DPB, in which case the video coder may likewise adjust POC values of pictures 102-114. However, because pictures 118-130 may depend from picture 132, it is expected that pictures 118-130 would not be present in the DPB when picture 132 is to be reset. That is, pictures 118-130 have a decoding order that is later than the decoding order of picture 132. Therefore, the video coder need not adjust POC values for pictures 118-130. In some examples, pictures 102-114 may also have a decoding order that is later than the decoding order of picture 132.

Figure 5:
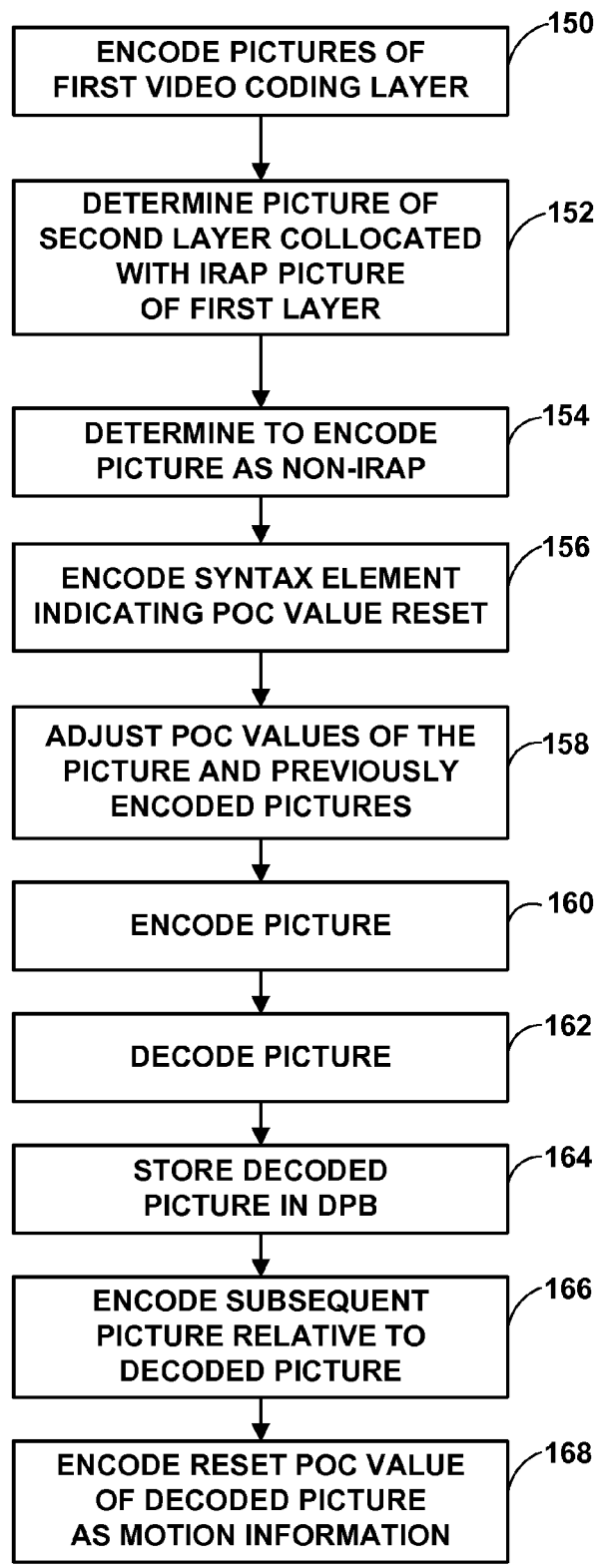
FIG. 5 is a flowchart illustrating an example method of encoding video data in accordance with the techniques of this disclosure.

FIG. 5 is a flowchart illustrating an example method of encoding video data in accordance with the techniques of this disclosure. Video encoder 20 is described as performing the method of FIG. 5. However, it should be understood that other coding devices may be configured to perform this or a similar method. Furthermore, the steps of the method may be performed in a different order, or in parallel, and certain steps may be added or omitted.

In the example of FIG. 5, video encoder 20 initially encodes pictures of a first video coding layer (150). As discussed above, the layer may correspond to a scalable video coding layer or a view for multiview video coding. Use of the term "first" in this context is intended to be nominal rather than ordinal; in some examples, video encoder 20 may have encoded one or more additional video coding layers prior to the first layer discussed with respect to FIG. 5. Encoding pictures of the first video coding layer generally involves encoding certain pictures of the first layer as intra random access point (IRAP) pictures, and other pictures as non-IRAP pictures, e.g., inter-predicted pictures (whether temporal or inter-layer).

Video encoder 20 may then determine a picture of a second video coding layer that is collocated with an IRAP picture of the first video coding layer (152). However, video encoder 20 may determine to encode this picture of the second video coding layer as a non-IRAP picture (154). For example, video encoder 20 may determine to encode the picture using temporal inter-prediction and/or inter-layer (e.g., inter-view) prediction.

As a result of the picture being a non-TRAP picture but collocated with an IRAP picture (e.g., included in the same access unit as the IRAP picture), video encoder 20 may encode a value for a syntax element that indicates that at least a portion of a POC value for the picture is to be reset (156). For example, the syntax element may comprise the poc_msb_reset_flag of Example 1 discussed above, or the poc_reset_flag of Example 2 discussed above. Moreover, video encoder 20 may adjust POC values of the picture and previously encoded pictures that are in the same layer and in the same coded video sequence (158). In particular, video encoder 20 may adjust the POC values of the other pictures such that differences between the POC values of the other pictures and the current picture remain the same after resetting the POC value for the current picture as before the reset.

Video encoder 20 may further encode the picture (160). That is, for each block of the picture, video encoder 20 may determine whether to intra-predict or inter-predict (using temporal or inter-layer prediction) the block. Video encoder 20 may then decode the picture (162) and store the decoded picture in a decoded picture buffer (DPB), e.g., reference picture memory 64. Video encoder 20 may then encode a portion of a subsequent picture (e.g., a picture in the same layer having a later coding order or a picture in the same access unit of a different layer) relative to the decoded picture (166). In order to identify the decoded picture, video encoder 20 may encode the reset POC value for the decoded picture as motion information of a block of the subsequent picture (168).

In this manner, the method of FIG. 5 represents an example of a method including determining whether to reset at least a portion of a picture order count (POC) value of a picture to a value of zero, in response to determining to reset the at least portion of the POC value, resetting at least the portion of the POC value such that the portion of the first POC value is equal to zero and encoding a value for a syntax element that indicates that at least the portion of the POC value is to be reset to the value of zero, and encoding video data using the reset POC value.

Figure 6:
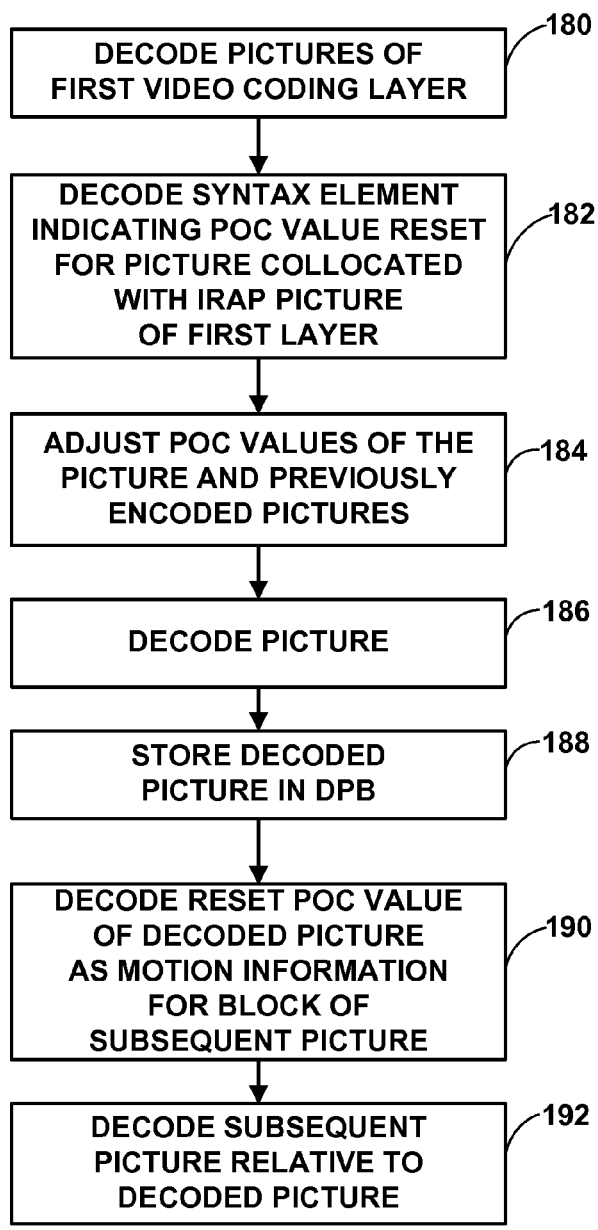
FIG. 6 is a flowchart illustrating an example method of decoding video data in accordance with the techniques of this disclosure.

FIG. 6 is a flowchart illustrating an example method of decoding video data in accordance with the techniques of this disclosure. Video decoder 30 is described as performing the method of FIG. 6. However, it should be understood that other coding devices may be configured to perform this or a similar method. Furthermore, the steps of the method may be performed in a different order, or in parallel, and certain steps may be added or omitted.

In the example of FIG. 6, video decoder 30 initially decodes pictures of a first video coding layer (180). As discussed above, the layer may correspond to a scalable video coding layer or a view for multiview video coding. Use of the term "first" in this context is intended to be nominal rather than ordinal; in some examples, video decoder 30 may have decoded one or more additional video coding layers prior to the first layer discussed with respect to FIG. 6. Decoding pictures of the first video coding layer generally involves decoding certain pictures of the first layer as intra random access point (IRAP) pictures, and other pictures as non-IRAP pictures, e.g., inter-predicted pictures (whether temporal or inter-layer).

Video decoder 30 may then decode a syntax element for a picture of a second video coding layer that is collocated with (i.e., in the same access unit as) an IRAP picture of the first video coding layer that indicates that at least a portion of the POC value for the picture is to be reset (182). For example, the syntax element may comprise the poc_msb_reset_flag of Example 1 discussed above, or the poc_reset_flag of Example 2 discussed above. Based on the value of this syntax element, video decoder 30 may adjust POC values of the picture and previously decoded pictures that are in the same layer and in the same coded video sequence (184). In particular, video decoder 30 may adjust the POC values of the other pictures such that differences between the POC values of the other pictures and the current picture remain the same after resetting the POC value for the current picture as before the reset.

Video decoder 30 may also decode the picture (186) and store the decoded picture in a decoded picture buffer (DPB), e.g., reference picture memory 82 (188). Decoding the picture may include decoding blocks of the picture using intra prediction, temporal inter-prediction, and/or inter-layer prediction. When performing inter-layer prediction, video decoder 30 may decode a POC value for a reference picture in another layer (e.g., the IRAP picture in the first layer) that is equal to the reset POC value for the current picture. When performing temporal inter-prediction, video decoder 30 may decode a POC value for a reference picture in the DPB, where the decoded POC value may correspond to one of the adjusted POC values for one of the previously decoded pictures in the DPB.

Furthermore, video decoder 30 may use the decoded picture as a reference picture for a picture that is to be subsequently decoded. That is, video decoder 30 may decode the reset POC value of the decoded picture as motion information (e.g., a motion parameter) for a block of a subsequent picture (190). The subsequent picture may be a subsequent picture in the second layer or a picture of a different layer (e.g., a picture in the same access unit as the decoded picture). In either case, the decoded motion information may include a reference to the POC value of the decoded picture, which corresponds to the reset POC value for the decoded picture (i.e., not the POC value for the picture prior to the reset). Based on this decoded POC value as motion information for the block of the subsequent picture, video decoder 30 may decode the block of the subsequent picture relative to the decoded picture (192).

In this manner, the method of FIG. 6 represents an example of a method including determining whether a value for a syntax element indicates that at least a portion of a picture order count (POC) value of a picture is to be reset to a value of zero, when the value for the syntax element indicates that the portion of the POC value is to be reset to the value of zero, resetting at least the portion of the POC value such that the portion of the POC value is equal to zero, and decoding video data using the reset POC value.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining whether a value for a syntax element indicates that at least a portion of a first picture order count (POC) value of a first picture is to be reset to a value of zero;
   when the value for the syntax element indicates that the portion of the first POC value is to be reset to the value of zero;
      resetting at least the portion of the first POC value such that the portion of the reset first POC value is equal to zero;
      determining a second POC value of a second picture, wherein the first picture and the second picture are in a common video coding layer and a common coded video sequence;
      determining a first difference between the first POC value and the second POC value; and
      decrementing the second POC value such that a second difference between the decremented second POC value and the reset first POC value is equal to the first difference; and
   decoding video data using the reset first POC value and the decremented second POC value.

2. The method of claim 1, wherein the value for the syntax element indicates whether all bits, including the portion, of the first POC value are to be reset to the value of zero, the method further comprising, when the value for the syntax element indicates that all bits of the first POC value are to be reset to the value of zero, resetting the first POC value such that all bits of the reset first POC value are equal to zero.

3. The method of claim 1, further comprising receiving an access unit including the first picture in a first video coding layer and a third picture in a second video coding layer, the first video coding layer comprising the common video coding layer, wherein the second video coding layer is different than the first video coding layer, and wherein, prior to resetting the first POC value, the first POC value for the first picture is different than a third POC value for the third picture.

4. The method of claim 3, wherein resetting the first POC value for the first picture comprises resetting the first POC value for the first picture such that, after the reset, the reset first POC value for the first picture is equal to the third POC value for the third picture.

5. The method of claim 3, wherein the third picture comprises an intra random access point (IRAP) picture with a NoRaslOutputFlag syntax element equal to 1 and wherein the first picture comprises a non-IRAP picture.

6. The method of claim 5, wherein the IRAP picture comprises one of an instantaneous decoder refresh (IDR) picture, a clean random access (CRA) picture, or a broken link access (BLA) picture.

7. The method of claim 3, wherein the access unit further includes a fourth picture in a third video coding layer different from the first video coding layer and the second video coding layer, and wherein decoding video data using the reset first POC value comprises decoding a block of the fourth picture using inter-layer prediction relative to the first picture when the block includes a reference to the reset first POC value.

8. The method of claim 1, further comprising, when the syntax element indicates that the portion of the first POC value is to be reset to the value of zero:
   determining POC values for a plurality of other pictures in the common video coding layer with the first picture, wherein the plurality of other pictures include pictures other than the first picture and the second picture;
   determining differences between the first POC value and the POC values for the other pictures; and
   decrementing the POC values for the other pictures such that respective differences between the decremented POC values and the reset first POC value are equal to the respective determined differences between the first POC value and the POC values for the other pictures.

9. The method of claim 8, wherein data for a reference picture set indicates whether the other pictures are short-term reference pictures or long-term reference pictures, and wherein decrementing the POC values comprises:
   decrementing the POC values for the short-term reference pictures; and
   decrementing the POC values for the long-term reference pictures.

10. The method of claim 1, wherein the syntax element comprises a POC reset flag.

11. The method of claim 1, further comprising decoding a slice header including the syntax element.

12. The method of claim 1, wherein the portion comprises most significant bits (MSBs) of the first POC value.

13. A method of encoding video data, the method comprising:
   determining whether to reset at least a portion of a first picture order count (POC) value of a first picture to a value of zero;
   in response to determining to reset the at least portion of the first POC value:
      resetting at least the portion of the first POC value, such that the portion of the reset first POC value is equal to zero;
      encoding a value for a syntax element that indicates that at least the portion of the first POC value is to be reset to the value of zero;
      determining a second POC value of a second picture, wherein the first picture and the second picture are in a common video coding layer and a common coded video sequence;
      determining a first difference between the first POC value and the second POC value; and
      decrementing the second POC value such that a second difference between the decremented second POC value and the reset first POC value is equal to the first difference; and encoding video data using the reset first POC value and the decremented second POC value.

14. The method of claim 13, wherein the value for the syntax element indicates whether all bits, including the portion, of the first POC value are to be reset to the value of zero, the method further comprising, when the value for the syntax element indicates that all bits of the first POC value are to be reset to the value of zero, resetting the first POC value such that all bits of the reset first POC value are equal to zero.

15. The method of claim 13, further comprising forming an access unit including the first picture in a first video coding layer and a third picture in a second video coding layer, the first video coding layer comprising the common video coding layer, wherein the second video coding layer is different than the first video coding layer, and wherein, prior to resetting the POC value, the first POC value for the first picture is different than a third POC value for the third picture.

16. The method of claim 15, wherein determining whether to reset comprises determining to reset the first POC value when the third picture comprises an intra random access point (IRAP) picture with a NoRaslOutputFlag syntax element equal to 1 and when the first picture comprises a non-IRAP picture.

17. The method of claim 15, wherein forming the access unit further comprises forming the access unit to include a fourth picture in a third video coding layer different from the first video coding layer and the second video coding layer, wherein encoding video data using the reset first POC value comprises:
encoding a block of the fourth picture using inter-layer prediction relative to the first picture; and
encoding a syntax element of the block to refer to the reset first POC value.

18. A device for coding video data, the device comprising:
a memory configured to store video data; and
a video coder configured to:
code a value for a syntax element indicating whether at least a portion of a first picture order count (POC) value of a first picture is to be reset to a value of zero,
when the value for the syntax element indicates that the portion of the first POC value is to be reset to the value of zero,
reset at least the portion of the first POC value such that the portion of the reset first POC value is equal to zero,
determine a second POC value of a second picture, wherein the first picture and the second picture are in a common video coding layer and a common coded video sequence;
determine a first difference between the first POC value and the second POC value; and
decrement the second POC value such that a second difference between the decremented second POC value and the reset first POC value is equal to the first difference; and
code the video data using the reset first POC value and the decremented second POC value.

19. The device of claim 18, wherein the value for the syntax element indicates whether all bits, including the portion, of the first POC value are to be reset to the value of zero, and wherein the video coder is further configured to, when the value for the syntax element indicates that all bits of the first POC value are to be reset to the value of zero, reset the first POC value such that all bits of the reset first POC value are equal to zero.

20. The device of claim 18, wherein the video coder is configured to code an access unit including the first picture in a first video coding layer and a third picture in a second video coding layer, the first video coding layer comprising the common video coding layer, wherein the second video coding layer is different than the first video coding layer, and wherein, prior to resetting the first POC value, the first POC value for the first picture is different than a third POC value for the third picture.

21. The device of claim 20, wherein the third picture comprises an intra random access point (IRAP) picture with a NoRaslOutputFlag syntax element equal to 1 and wherein the first picture comprises a non-IRAP picture.

22. The device of claim 20, wherein the access unit further includes a fourth picture in a third video coding layer different from the first video coding layer and the second video coding layer, and wherein to code video data using the reset first POC value, the video coder is configured to code a block of the fourth picture using inter-layer prediction relative to the first picture when the block includes a reference to the reset first POC value.

23. The device of claim 18, wherein the syntax element comprises a POC reset flag.

24. The device of claim 18, wherein the video coder comprises a video decoder configured to decode the video data using the reset first POC value.

25. The device of claim 18, wherein the video coder comprises a video encoder configured to encode the video data using the reset first POC value.

26. The device of claim 18, wherein the device comprises at least one of:
an integrated circuit;
a microprocessor; and
a wireless communication device.

27. A device for coding video data, the device comprising:
means for coding a value for a syntax element indicating whether at least a portion of a first picture order count (POC) value of a first picture is to be reset to a value of zero;
means for resetting, when the value for the syntax element indicates that the portion of the first POC value is to be reset to the value of zero, at least the portion of the first POC value such that the portion of the reset first POC value is equal to zero;
means for determining a second POC value of a second picture when the syntax element indicates that the portion of the first POC value is to be reset to the value of zero, wherein the first picture and the second picture are in a common video coding layer and a common coded video sequence;
means for determining a first difference between the first POC value and the second POC value;
means for decrementing the second POC value such that a second difference between the decremented second POC value and the reset first POC value is equal to the first difference; and
means for coding video data using the reset first POC value and the decremented second POC value.

28. The device of claim 27, wherein the value for the syntax element indicates whether all bits, including the portion, of the first POC value are to be reset to the value of zero, wherein the means for resetting comprise means for resetting, when the value for the syntax element indicates that all bits of the first POC value are to be reset to the value of zero, the first POC value such that all bits of the reset first POC value are equal to zero.

29. The device of claim 27, further comprising means for coding an access unit including the first picture in a first video coding layer and a third picture in a second video coding layer, the first video coding layer comprising the common video coding layer, wherein the second video coding layer is different than the first video coding layer, and wherein, prior to resetting the first POC value, the first POC value for the first picture is different than a third POC value for the third picture.

30. The device of claim 29, wherein the third picture comprises an intra random access point (IRAP) picture with a NoRaslOutputFlag syntax element equal to 1 and wherein the first picture comprises a non-IRAP picture.

31. The device of claim 29, wherein the access unit further includes a fourth picture in a third video coding layer different from the first video coding layer and the second video coding layer, and wherein the means for coding video data using the reset first POC value comprises means for coding a block of the fourth picture using inter-layer layer prediction relative to the first picture when the block includes a reference to the reset first POC value.

32. The device of claim 27, wherein the syntax element comprises a POC reset flag.

33. A computer-readable storage medium having stored thereon instructions that, when executed, cause a processor of a device for coding video data to:
code a value for a syntax element indicating whether at least a portion of a first picture order count (POC) value of a picture is to be reset to a value of zero;
when the value for the syntax element indicates that the portion of the first POC value is to be reset to the value of zero:
reset at least the portion of the first POC value such that the portion of the reset first POC value is equal to zero;
determine a second POC value of a second picture, wherein the first picture and the second picture are in a common video coding layer and a common coded video sequence;
determine a first difference between the first POC value and the second POC value; and
decrement the second POC value such that a second difference between the decremented second POC value and the reset first POC value is equal to the first difference; and
code video data using the reset first POC value and the decremented second POC value.

34. The computer-readable storage medium of claim 33, wherein the value for the syntax element indicates whether all bits, including the portion, of the first POC value are to be reset to the value of zero, further comprising instructions that cause the processor to, when the value for the syntax element indicates that all bits of the first POC value are to be reset to the value of zero, reset the first POC value such that all bits of the reset first POC value are equal to zero.

35. The computer-readable storage medium of claim 33, further comprising instructions that cause the processor to code an access unit including the first picture in a first video coding layer and a third picture in a second video coding layer, the first video coding layer comprising the common video coding layer, wherein the second video coding layer is different than the first video coding layer, and wherein, prior to resetting the first POC value, the first POC value for the first picture is different than a third POC value for the third picture.

36. The computer-readable storage medium of claim 35, wherein the third picture comprises an intra random access point (IRAP) picture with a NoRaslOutputFlag syntax element equal to 1 and wherein the first picture comprises a non-IRAP picture.

37. The computer-readable storage medium of claim 35, wherein the access unit further includes a fourth picture in a third video coding layer different from the first video coding layer and the second video coding layer, and wherein the instructions that cause the processor to code video data using the reset first POC value comprise instructions that cause the processor to code a block of the fourth picture using inter-layer prediction relative to the first picture when the block includes a reference to the reset first POC value.

38. The computer-readable storage medium of claim 33, wherein the syntax element comprises a POC reset flag.

\* \* \* \* \*